US012725949B2

(12) United States Patent
Yang et al.

(10) Patent No.: US 12,725,949 B2
(45) Date of Patent: Sep. 1, 2026

(54) SURFACE MOUNT CARD EDGE CONNECTOR AND COMPACT ELECTRONIC SYSTEM THEREWITH

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

(*) Notice: Subject to any disclaimer, the term of this patent is extended or adjusted under 35 U.S.C. 154(b) by 408 days.

(21) Appl. No.: 18/453,504

(22) Filed: Aug. 22, 2023

(65) Prior Publication Data

US 2024/0072467 A1 Feb. 29, 2024

(30) Foreign Application Priority Data

Aug. 24, 2022 (CN) ........................ 202211018354.X
Aug. 24, 2022 (CN) ........................ 202222242656.7

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7023* (2013.01); *H01R 12/721* (2013.01); *H01R 13/6461* (2013.01)

(58) Field of Classification Search
CPC .............. H01R 12/716; H01R 12/7023; H01R 12/721; H01R 13/6461
(Continued)

(56) References Cited

U.S. PATENT DOCUMENTS 5,096,440 A * 3/1992 Katsumata ............. H01R 12/58 439/570
5,171,165 A * 12/1992 Hwang .............. H01R 12/7029 439/571

(Continued)

FOREIGN PATENT DOCUMENTS

CN 2485827 Y * 4/2002
CN 201336401 Y * 10/2009 ........... H01R 12/707

(Continued)

OTHER PUBLICATIONS

[No Author Listed], Amphenol Information Communications and Commerical Products. Amphenol ICC Storage & Server IO. 2023, 10 pages. URL:https://cdn.amphenol-cs.com/media/wysiwyg/files/documentation/customerpresentation/ddr4_product_presentation.pdf [retrieved on Dec. 19, 2023].

(Continued)

*Primary Examiner* — Abdullah A Riyami
(74) *Attorney, Agent, or Firm* — Wolf, Greenfield & Sacks, P.C.

(57) ABSTRACT

Surface mount card edge connectors and compact systems using such connectors are provided. A connector has a housing holding conductive elements with a mating face and a mounting face configured to face a side surface of a board. Each conductive element comprises a mating contact portion and a mounting tail extending beyond the mounting face and having an end surface configured to be mounted to a surface pad on a surface of the board. The connector has one or more board locks. Each board lock has a body portion disposed in the housing and a mounting portion having an end surface parallel to the end surfaces of the mounting tails of the conductive elements. Such a configuration enables connectors mounted to opposite sides of a board to be aligned such that a system with these connectors may be more compact.

20 Claims, 18 Drawing Sheets

(51) Int. Cl.
*H01R 12/72* (2011.01)
*H01R 13/6461* (2011.01)

(58) Field of Classification Search
USPC .............................................................. 439/65
See application file for complete search history.

(56) References Cited

U.S. PATENT DOCUMENTS 5,186,654 A * 2/1993 Enomoto ............. H01R 12/707 439/570
5,199,884 A * 4/1993 Kaufman ............. H01R 12/716 439/570
5,921,787 A * 7/1999 Pope ...................... H01R 12/85 439/74
6,086,416 A * 7/2000 Choy ................. H01R 12/7029 439/570
6,638,105 B1 * 10/2003 Wu .................... H01R 12/7029 439/567
6,648,682 B1 * 11/2003 Wu .................... H01R 12/7029 439/567
7,081,014 B2 * 7/2006 Pan .................... H01R 12/7052 439/660
7,607,949 B2 10/2009 Hsu
7,637,783 B2 12/2009 Sasaoka et al.
7,677,907 B2 3/2010 Guan et al.
7,731,541 B1 6/2010 Lee et al.
7,892,006 B2 2/2011 Guan et al.
7,972,171 B2 * 7/2011 Teh ...................... H01R 12/721 439/570
8,025,507 B2 9/2011 Kim et al.
8,142,207 B1 3/2012 Ljubijankic et al.
8,177,581 B2 * 5/2012 Zeng .................. H01R 12/7064 439/567
8,187,031 B2 5/2012 Li et al.
8,403,689 B2 3/2013 Li et al.
8,444,427 B2 * 5/2013 Hashimoto .......... H01R 12/774 439/325
8,480,434 B2 * 7/2013 Funayama ........... H01R 12/716 439/637
8,535,077 B2 9/2013 Shen et al.
8,721,350 B2 5/2014 Liu et al.
9,166,317 B2 * 10/2015 Briant .................. H01R 12/737
9,276,335 B2 * 3/2016 Fricker ................ H01R 12/523
9,325,090 B2 4/2016 Shen et al.
9,431,734 B2 8/2016 Guo et al.
9,685,723 B2 * 6/2017 Kee Mew .......... H01R 12/7005
9,887,485 B2 2/2018 Lambie et al.
10,103,476 B1 * 10/2018 Qiu ........................ H01R 13/10
10,135,165 B2 11/2018 Zuo
10,224,653 B2 3/2019 Niu et al.
10,320,102 B2 * 6/2019 Phillips ................ H01R 13/506
10,461,467 B2 10/2019 Eppley et al.
10,741,944 B2 8/2020 Long
10,756,489 B2 * 8/2020 Hu ..................... H01R 13/6594
10,797,428 B2 * 10/2020 Tan ...................... H01R 12/721
10,855,020 B1 12/2020 Phillips et al.
10,916,894 B2 2/2021 Kirk et al.
11,081,827 B2 * 8/2021 Eng-Kan ............ H01R 13/6273
11,374,340 B2 6/2022 Tang
11,545,769 B2 1/2023 Comerci et al.
11,637,391 B2 4/2023 Guo et al.
11,710,923 B2 7/2023 Hu et al.
11,817,639 B2 11/2023 Yi et al.
2010/0075538 A1 3/2010 Ohshida
2011/0021080 A1 1/2011 Kamiya et al.
2011/0065297 A1 3/2011 Guan et al.
2011/0136388 A1 6/2011 Fu et al.
2011/0275238 A1 11/2011 Iijima et al.
2012/0178274 A1 7/2012 Manickam
2012/0202387 A1 8/2012 McNamara
2013/0280926 A1 10/2013 Ono
2016/0020540 A1 1/2016 Shen et al.
2016/0118736 A1 4/2016 Hoyack et al.
2016/0190724 A1 6/2016 Mito
2016/0336667 A1 * 11/2016 Kee Mew .......... H01R 12/7005
2017/0302031 A1 10/2017 Cheng et al.
2018/0198220 A1 7/2018 Sasame et al.
2019/0165518 A1 5/2019 Hsu et al.
2019/0173209 A1 6/2019 Lu et al.
2019/0173232 A1 6/2019 Lu et al.
2019/0199023 A1 6/2019 Soh
2020/0076131 A1 3/2020 Hu et al.
2020/0076135 A1 3/2020 Tang et al.
2020/0203867 A1 6/2020 Lu
2021/0288423 A1 9/2021 Guo et al.
2021/0351529 A1 11/2021 Yang et al.
2021/0376508 A1 12/2021 Hu
2022/0037828 A1 2/2022 Hu et al.
2022/0069496 A1 3/2022 Yi et al.
2022/0181809 A1 6/2022 Xie et al.
2022/0181811 A1 6/2022 Liu et al.
2022/0247107 A1 8/2022 Tang et al.
2023/0096092 A1 3/2023 Hu
2023/0126150 A1 4/2023 Yang et al.
2023/0163500 A1 5/2023 Yang et al.
2023/0178916 A1 6/2023 Yang et al.
2023/0238724 A1 7/2023 Yang et al.
2023/0335931 A1 10/2023 He et al.

FOREIGN PATENT DOCUMENTS

CN 201829641 U * 5/2011
CN 202633554 U 12/2012
CN 203660106 U 6/2014
CN 105703103 A 6/2016
CN 108539464 A 9/2018
CN 109586061 A * 4/2019 ........... H01R 12/716
CN 111064043 A * 4/2020 ........... H01R 12/716
CN 212392415 U * 1/2021
CN 212874843 U 4/2021
CN 214505858 U 10/2021
GB 227943 A 1/1925
JP H0229172 U * 2/1990 ......... H04N 5/23212
JP 2008135314 A * 6/2008
JP 2010080322 A * 4/2010
TW 200835073 A 8/2008
TW M475740 U 4/2014
WO WO-9802942 A2 * 1/1998 ........... H01R 12/716
WO WO 02/073819 A2 9/2002

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

Yang et al., Reliable Card Edge Connector with Narrow Latch, U.S. Appl. No. 18/346,155, filed Jun. 30, 2023.

Yang et al., Card Edge Connector With Reduced Height, U.S. Appl. No. 18/453,448, filed Aug. 22, 2023.

Yang et al., Robust Card Edge Connector, U.S. Appl. No. 18/346,150, filed Jun. 30, 2023.

(56) References Cited

OTHER PUBLICATIONS

Yang et al., Robust Electrical Connector, U.S. Appl. No. 18/505,468, filed Nov. 9, 2023.

* cited by examiner

SURFACE MOUNT CARD EDGE CONNECTOR AND COMPACT ELECTRONIC SYSTEM THEREWITH

RELATED APPLICATIONS

This application claims priority to and the benefit of Chinese Patent Application Serial No. 202222242656.7, filed on Aug. 24, 2022. This application also claims priority to and the benefit of Chinese Patent Application Serial No. 202211018354.X, filed on Aug. 24, 2022. The entire contents of these applications are incorporated herein by reference in their entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as separate electronic assemblies, such as printed circuit boards ("PCBs"), which may be joined together with electrical connectors. A known arrangement for joining several printed circuit boards may have one printed circuit board serve as a mainboard. Other printed circuit boards, called "daughter boards" or "daughter cards," may be connected through the mainboard.

A card edge connector, as an electrical connector, has been widely applied to electronic products, which can connect an electronic card, such as internal memory card, graphics card, sound card and so on, to a circuit board, so that the electronic card provides memory capacities for the electronic products and enhance the relevant functions, like running rate, of the electronic products. The electronic products may be computers. According to a Joint Electron Device Engineering Council (JEDEC) standard for example, a card edge connector can have a board lock that is either a metal tab or a fork lock so as to be inserted into through holes of a board.

BRIEF SUMMARY

Aspects of the present application relate to surface mount card edge connectors and compact electronic systems therewith.

Some embodiments relate to a card edge connector. The card edge connector may include a housing comprising a mating face, a mounting face, and a slot extending from the mating face toward the mounting face; a plurality of conductive elements held by the housing, each of the plurality of conductive elements comprising a mating contact portion curving into the slot, a mounting tail extending beyond the mounting face and comprising an end surface configured to be mounted to a surface pad on a circuit board, and an intermediate portion joining the mating contact portion and the mounting tail; and a board lock comprising a body portion disposed in the housing and a mounting portion connected to the body portion, the mounting portion comprising an end surface parallel to the end surfaces of the mounting tails of the plurality of conductive elements.

Optionally, the board lock may be a first board lock disposed at an end portion of the housing; and the card edge connector may comprise a second board lock disposed at an intermediate portion of the housing that corresponds to a rib within the slot.

Optionally, the housing may comprise a first positioning post and a second positioning post protruding from the mounting face at opposite ends of the housing, respectively; and the first positioning post and the second positioning post may be disposed on opposed sides of the slot.

Optionally, each of the first positioning post and the second positioning post may be offset from a centerline of the slot; the first positioning post and the second positioning post may be asymmetrical with respect to the centerline of the slot; and the mounting ends of the plurality of conductive elements may be symmetrical about the centerline of the slot.

Optionally, the housing may comprise a groove with an opening at the mounting face; and the body portion of the board lock may be disposed in the groove.

Optionally, a depth of the groove may be greater than a length of the body portion of the board lock such that a position of the body portion within the groove may be adjustable.

Optionally, the body portion of the board lock may comprise barbs on opposite sides; and the barbs engage side walls of the groove.

Optionally, the body portion of the board lock may extend perpendicular to the mounting portion; and the mounting portion of the board lock may extend parallel to the mounting face of the housing.

Optionally, the board lock may comprise a transition portion joining the body portion and the mounting portion; and a width of the transition portion may be less than a width of the body portion and a width of the mounting portion.

Optionally, the housing may comprise a recessed portion at a position surrounded by the transition portion; and an opening of the recessed portion may face the transition portion.

Optionally, the mounting portion may comprise a first mounting portion and a second mounting portion spaced apart from each other.

Some embodiments relate to a card edge connector. The card edge connector may include a housing comprising a mating face, a mounting face, and a slot extending from the mating face toward the mounting face; a plurality of conductive elements held by the housing, each of the plurality of conductive elements comprising a mating contact portion curving into the slot, a mounting tail extending beyond the mounting face, and an intermediate portion joining the mating contact portion and the mounting tail; and a board lock comprising a body portion disposed in the housing and extending in a vertical direction and a mounting portion extending in a direction perpendicular to the vertical direction.

Optionally, the body portion may be a first body portion; the board lock may comprise a second body portion; and the first body portion and the second body portion may be disposed on opposite sides of the mounting portion so that the board lock may be U-shaped.

Optionally, the first body portion and the second body portion may be disposed on opposite sides of the slot.

Optionally, the slot may extend in a longitudinal direction perpendicular to the vertical direction; and the body portion may extend in a plane perpendicular to the longitudinal direction.

Optionally, the mounting portion may extend toward an end of the housing.

Optionally, the mounting portion may comprise a through-hole.

Optionally, the body portion of the board lock may comprise a space facing the mating face of the housing; the card edge connector may comprise a latch pivotably disposed in the housing between a locked position and an unlocked position; and an opening of the space of the body portion of the board lock may face a tail of the latch.

Some embodiments relate to an electronic system. The electronic system may include a circuit board having a first surface and a second surface on opposite sides; and a first card edge connector mounted to the first surface of the circuit board and a second card edge connector mounted to the second surface of the circuit board, each of the first card edge connector and the second card edge connector comprising: a housing comprising a mating face, and a mounting face facing a respective one of the first surface of the board and the second surface of the circuit board, and a board lock comprising a body portion disposed in the housing and a mounting portion connected to the body portion and mounted to the respective one of the first surface of the board and the second surface of the circuit board.

Optionally, the circuit board may comprise a first surface pad on the first surface, a second surface pad on the second surface, and two positioning holes each extending through the first surface and the second surface and disposed adjacent to the first surface pad and the second surface pad; the mounting portion of the board lock of the first card edge connector may be mounted to the first surface pad on the first surface of the circuit board; the mounting portion of the board lock of the second card edge connector may be mounted to the second surface pad on the second surface of the circuit board; the first card edge connector may comprise a first positioning post disposed in one of the two positioning holes of the circuit board; and the second card edge connector comprise a second positioning post disposed in the other one of the two positioning holes of the circuit board.

Some embodiments relate to a card edge connector. The card edge connector may comprise an insulating housing and a board lock. The insulating housing may have an mating face and a mounting face. The mating face may have a slot extending along a longitudinal direction for receiving an electronic card. The board lock may have a body portion and a mounting portion. The body portion may connect to the mounting face. The mounting portion may be used to be mounted to a circuit board based on Surface Mounted Technology.

Optionally, the board lock may be provided on one or more of end portions of the insulating housing and an intermediate portion corresponding to a rib within the slot.

Optionally, the insulating housing may have a first positioning post and a second positioning post protruded from the mounting face at each end, and the first positioning post and the second positioning post may be disposed at a diagonal of the mounting face.

Optionally, the first positioning post and the second positioning post may have different cross-sections.

Optionally, the mounting face may have a groove, and the body portion of the board lock may be interference fit with the groove.

Optionally, the depth of the groove may be greater than the length of the body portion of the board lock so that the position of the body portion within the groove is adjustable.

Optionally, barbs may be provided on both sides of the body portion of the board lock, and the barbs may engage with the side walls of the groove.

Optionally, the card edge connector may further comprise a plurality of conductive elements. Each of the plurality of conductive elements may include a mating contact portion bended into the slot, a mounting tail extending beyond the mounting face and an intermediate portion connected between the mating contact portion and the mounting tail.

Optionally, the mounting tail may be based on Surface Mounted Technology, and an end surface of the mounting portion parallel to the mounting face may be coplanar with an end surface of the mounting tail parallel to the mounting face.

Optionally, the body portion may be perpendicular to the mounting portion, and the mounting portion may be parallel to the mounting face.

Optionally, the board lock may further comprise a transition portion connected between the body portion and the mounting portion, and the width of the transition portion may be less than the width of the body portion and the width of the mounting portion.

Optionally, the insulating housing may have a recessed portion at a position surrounded by the transition portion, and the opening of the recessed portion may face to the transition portion.

Optionally, there may be a gap between all sides of the transition portion and the insulating housing.

Optionally, the mounting portion may be spaced from the insulating housing.

Optionally, the body portion may comprise a first body portion and a second body portion provided on opposite sides of the mounting portion along a transverse direction so that the board lock is U-shaped, and the transverse direction is perpendicular to the longitudinal direction.

Optionally, the first body portion and the second body portion may be parallel to the longitudinal direction.

Optionally, the first body portion and the second body portion may be respectively disposed on two sides of the slot, along the transverse direction.

Optionally, the body portion may extend along a transverse direction perpendicular to the longitudinal direction.

Optionally, the mounting portion, relative to the body portion, may be bent toward an end of the insulating housing.

Optionally, the mounting portion may have a through-hole.

Optionally, the board lock may be in the form of a flat plate, and the board lock may extend along a transverse direction perpendicular to the longitudinal direction.

Optionally, the mounting portion may comprise a first mounting portion and a second mounting portion disposed spaced apart along the transverse direction.

Optionally, an space may be provided in the middle of the side of the body portion facing to the mating face. An end of the insulating housing may have a latch pivotable between a locked position and an unlocked position. The opening of the space may face to the tail of the latch.

Optionally, the tail of the latch may have an outer side facing to the space and an inner side facing to the slot. A first notch and a second notch may be respectively provided at two ends of the outer side along a transverse direction, so that the transverse width of the outer side is less than that of the inner side. The transverse width of the space may be greater than that of the outer side and less than that of the inner side. The transverse direction is perpendicular to the longitudinal direction.

Some embodiments relate to an electronic system. The electronic system may comprise a circuit board, a first card edge connector and a second card edge connector. The circuit board may have a first surface and a second surface in opposite position. The first surface may have a first surface pad, and the second surface may have a second surface pad. The first card edge connector may be any card edge connector described herein. The mounting portion of the board lock of the first card edge connector may be mounted to the first surface pad. The second card edge connector may be any card edge connector described herein. The mounting portion of the board lock of the second card edge connector may be mounted to the second surface pad.

Optionally, in the direction perpendicular to the circuit board, the first card edge connector and the second card edge connector may be disposed coincident with each other.

Optionally, two first positioning holes and two second positioning holes may be provided on the circuit board at the positions corresponding to both ends of the first card edge connector and the second card edge connector. The two first positioning holes may be disposed symmetrically about the central line of the first card edge connector extending along the longitudinal direction, and the two second positioning holes may be disposed symmetrically about the central line of the first card edge connector extending along the longitudinal direction.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
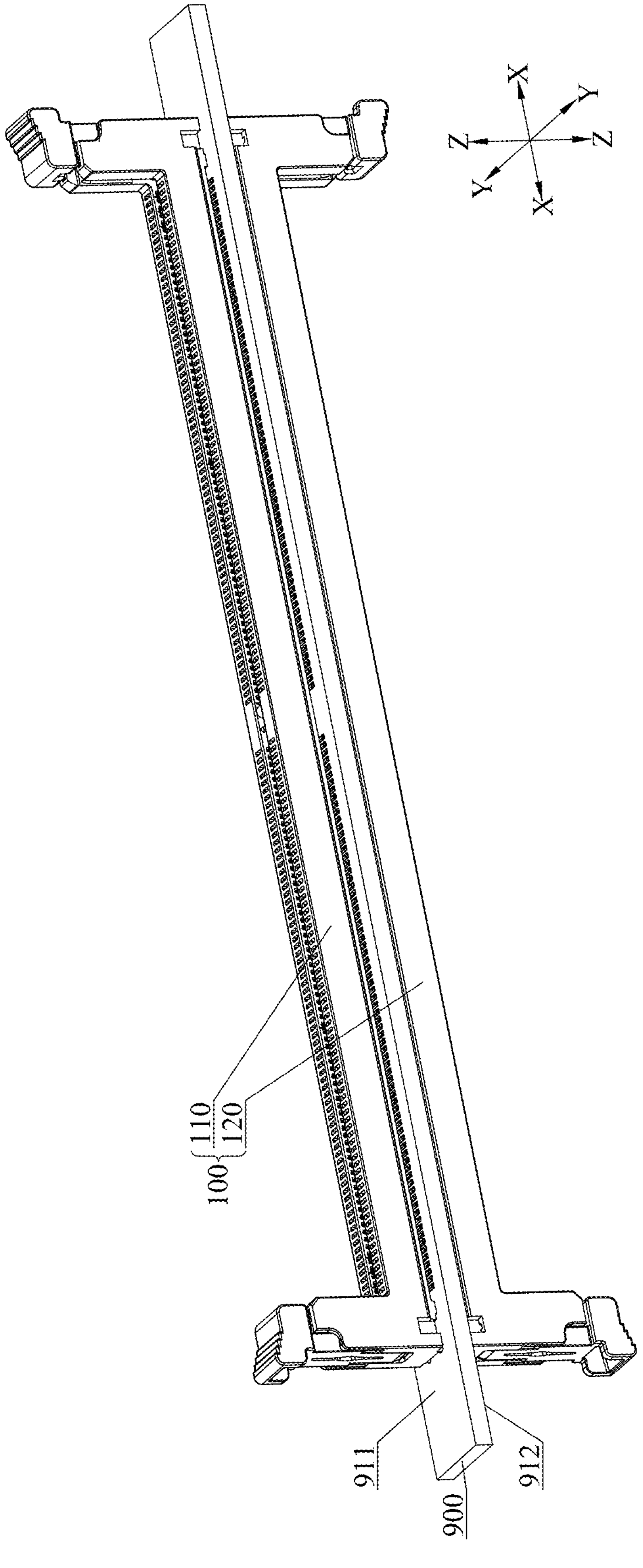
FIG. 1 is a perspective view of an electronic system according to an exemplary embodiment of the present disclosure.

The above accompanying drawings include the following reference signs:

100, card edge connector; 110, first card edge connector; 120, second card edge connector; 200, insulating housing; 201, mating face; 203, mounting face; 205, intermediate portion; 207, end portion; 210, slot; 211, rib; 221, body; 222, tower; 231, first positioning post; 232, second positioning post; 250, groove; 270, recessed portion; 300, 300', 300", board lock; 310, body portion; 311, first body portion; 312, second body portion; 330, mounting portion; 331, end surface; 333, through-hole; 335, first mounting portion; 337, second mounting portion; 350, barb; 370, transition portion; 390, space; 400, conductive element; 410, mating contact portion; 430, mounting tail; 431, end surface; 450, intermediate portion; 500, latch; 510, tail; 511, outer side; 513, inner side; 531, first notch; 532, second notch; 900, circuit board; 911, first surface; 912, second surface; 931, first surface pad; 932, second surface pad; 951, first positioning hole; 952, second positioning hole.

DETAILED DESCRIPTION

The inventors have recognized and appreciated connector designs that enable compact systems with connectors mounted on opposite sides of the circuit board. The connectors may be surface mounted on opposite sides of a circuit board. The connectors may include one or more features that enable the connectors mounted on opposite sides to be aligned. Board locks of the connector may engage the circuit board via surface mount soldering. Alternatively or additionally, the connectors may include asymmetric positioning posts. With such a configuration, the mounting structures for a connector on one side of the board do not interfere with mounting structures for a connector on the opposite side of the board, even when those connectors are aligned, enabling connectors to be mounted more compactly. These techniques may be used in card edge connectors, such as Double-Data-Rate (DDR) connectors.

Card edge connectors, such as Double-Data-Rate (DDR) connector, may be used for interconnection between electronic cards in an electronic system. Electronic cards include, but are not limited to, graphics card, internal memory card and so on. The card edge connector may be fixed to a circuit board, and conductive elements on the card edge connector may be connected to a circuit on the circuit board. The electronic card may be inserted into the card edge connector so that gold fingers on the electronic card are electrically connected with the conductive elements of the card edge connector, thereby interconnecting the gold fingers on the electronic card with the circuit on the circuit board.

Conventionally, a DDR card edge connector has either tab locks or fork locks, which are configured to be inserted into through-holes in a circuit board. Either the tab lock or the fork lock usually includes features (e.g., recesses, curved portions) on the sides so as to engage edges of the through-holes in the circuit boards, which provides forces to retain the card edge connector on the circuit board.

The inventors have recognized and realized that either the tab lock or the fork lock requires corresponding through-holes in the circuit board, which limit the circuit board to have connectors mounted to one side surface, resulting in the low space utilization of the circuit board. Moreover, when mounting an electrical connector onto the circuit board, in addition to considering whether there is enough space to accommodate the electrical connector after observing from the outside, the conductive elements on the electrical connector should also be interconnected with the circuit on the circuit board. When the position of the electrical connector on the circuit board is subject to many restrictions, there will be higher requirements on the wiring inside the circuit board and the layout design for surface pads on the surface of the circuit board, which may significantly prolong the development cycle of the product and increase the development cost thereof. In addition, the circuit board is always disposed with electronic devices of various types and dimensions, and their positions on the circuit board may be limited by existing designs. Further, since the tab lock and fork lock are inserted into the through-holes, it would be difficult to rework the mounting of the connector in order to, for example, remove the connector from the circuit board.

The inventors have recognized and appreciated connectors designs that enable the connectors to be mounted to opposite side surfaces of a circuit board, which may increase the usage of board real estate and ease design limitations for routing metal traces in the board. In some embodiments, a connector may have a housing holding conductive elements. The housing may have a mating face and a mounting face configured to face a side surface of a board. Each conductive element may comprise a mating contact portion and a mounting tail extending beyond the mounting face and having an end surface configured to be mounted to a surface pad on a side surface of the board. The connector may have one or more board locks. Each board lock may have a body portion disposed in the housing and a mounting portion connected to the body portion. In some embodiments, for each board lock, the mounting portion may extend perpendicular to the body portion such that the mounting portion can be surface mounted to a circuit board. In some embodiments, the mounting portion of each board lock may have an end surface disposed to be coplanar with the end surfaces of the mounting tails of the conductive elements, such that the board locks and the conductive elements may both be surface mounted to a side surface of the circuit board. Such a configuration may also enable a simpler process for reworking the mounting of the connectors.

The card edge connector and electronic system according to some embodiments of the present disclosure are described in detail below in conjunction with the accompanying drawings.

A vertical direction Z-Z, a longitudinal direction X-X and a transverse direction Y-Y described herein may be perpendicular each other. The vertical direction Z-Z may refer to a height direction of the card edge connector. The longitudinal direction X-X may refer to a length direction of the card edge connector. The transverse direction Y-Y may refer to a width direction of the card edge connector.

As shown in FIGS. 4-7, a card edge connector 100 may comprise an insulating housing 200 and a board lock 300.

The insulating housing 200 may be molded from insulating materials such as plastics. The plastics may include but are not limited to liquid crystal polymers (LCP), polyphenylene sulfide (PPS), high temperature nylon or poly-phenylene oxide (PPO) or polypropylene (PP), or other materials may also be used. In some cases, the plastics may be thermosetting plastics. In some cases, the insulating plastics may comprise those such as glass-fiber-reinforced insulating materials. The insulating housing 200 may be a one-piece member. The insulating housing 200 may have a mating face 201 and a mounting face 203. In the embodiments where the card edge connector 100 is a right-angle connector, the mating face 201 and the mounting face 203 may be perpendicular to each other. In the card edge connector 100 of other types, such as a vertical connector as shown in the figures, the mating face 201 and the mounting face 203 may be parallel to each other.

The mating face 201 may have a slot 210 extending along the longitudinal direction X-X. The slot 210 may be recessed toward the mounting face 203 so as to receive an edge of an electronic card (not shown). Electronic cards include but are not limited to internal memory card, graphics card and so on. The edge of the electronic card may be inserted into the slot 210. A rib 211 may be disposed within the slot 210. The rib 211 may connect two opposite side walls of the slot 210 along the transverse direction Y-Y. The rib 211 may provide a fool-proof function to prevent the electronic card from being inserted into the slot 210 in a wrong direction. The rib 211 also enhances the strength of the insulating housing 200.

The insulating housing 200 may comprise a body 221 and a tower 222. The body 221 may extend along the longitudinal direction X-X. The tower 222 may be connected to an end of the body 221 in the longitudinal direction X-X. The tower 222 may extend along the vertical direction Z-Z to protrude upward from the end of the body 221. The slot 210 may extend along the body 221 and the end of the slot 210 may extend into the tower 222. Exemplarily, the tower 222 may be provided on only one end of the body 221 along the longitudinal direction X-X. More preferably, the towers 222 may be provided on both ends of the body 221 along the longitudinal direction X-X. The towers 222 may be disposed on opposite sides of the body 221 along the longitudinal direction X-X, respectively. The tower 222 may act as a longitudinal end of the insulating housing 200.

The card edge connector 100 may comprise conductive elements 400. The conductive elements 400 may be held by the insulating housing 200. Adjacent conductive elements 400 may be spaced apart to ensure that the adjacent conductive elements 400 are electrically insulated from each other. The conductive elements 400 may be made of conductive materials such as, metal. Each conductive element 400 may be an elongated one-piece member. The conductive element 400 may extend from the mounting face 203 into the slot 210. Specifically, each conductive element 400 may include a mating contact portion 410, a mounting tail 430 and an intermediate portion 450 along its extension direction. The mating contact portion 410 may extend into slot 210. The mating contact portion 410 may be bent inwardly toward the slot 210 so as to protrude into the slot 210. The mounting tail 430 may extend beyond the mounting face 203. The intermediate portion 450 may connect the mating contact portion 410 and the mounting tail 430.

The conductive elements 400 may be arranged in two rows on both sides of the slot 210 along the transverse direction Y-Y, with each row extending along the longitudinal direction X-X. Optionally, the two rows of conductive elements 400 may be aligned with each other along the longitudinal direction X-X. Optionally, the two rows of conductive elements 400 may be staggered along the longitudinal direction X-X to increase the space between the conductive elements 400 in order to reduce crosstalk. Optionally, the conductive elements 400 may be disposed on one side of the slot 210.

When the edge of the electronic card is inserted into the slot 210, gold fingers of the electronic card may electrically contact with the mating contact portion 410, thereby achieving electrical connection. The mounting tail 430 may be connected to the circuit board. The mounting tail 430 may be configured to be mounted to a surface of a board. For example, the mounting tail 430 may be soldered or welded to a surface pad on the circuit board, thereby achieving electrical connection with the circuit on the circuit board. In this way, the card edge connector 100 enables interconnection of the electronic card with the circuit on the circuit board.

A board lock 300 may be made of the materials with greater strength such as plastics, ceramic, metal and so on. The board lock 300 may be a metallic piece. The metallic materials have greater strength, and both the material cost and the processing cost are lower. With such a configuration, the board lock 300 has higher mechanical strength and lower material costs, and is easier to process. The board lock 300 may be a one-piece member or an integrated member with multiple sections spliced together.

Figure 6:
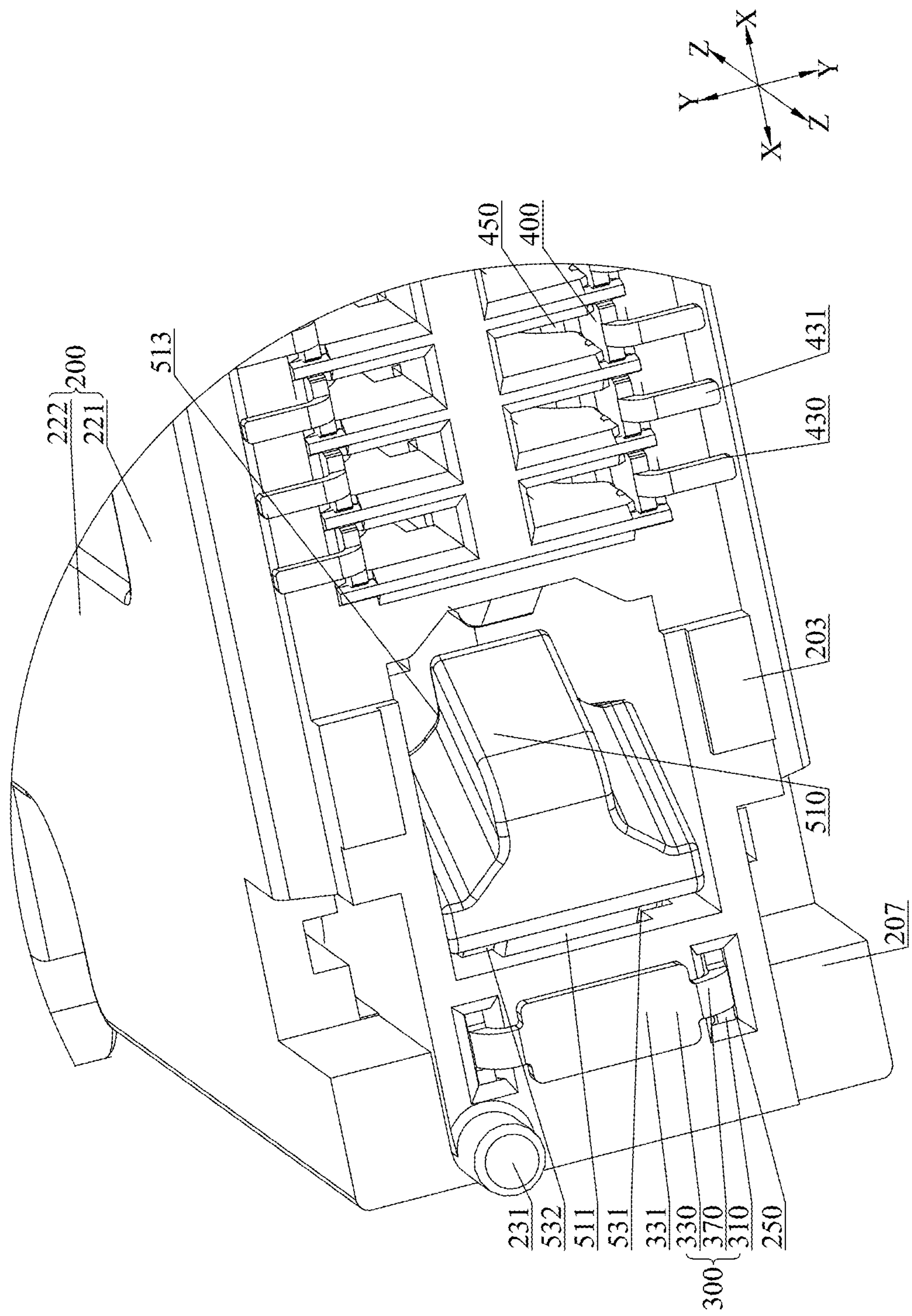
FIG. 6 is a partially enlarged view of the card edge connector as shown in FIG. 5.
Figure 7:
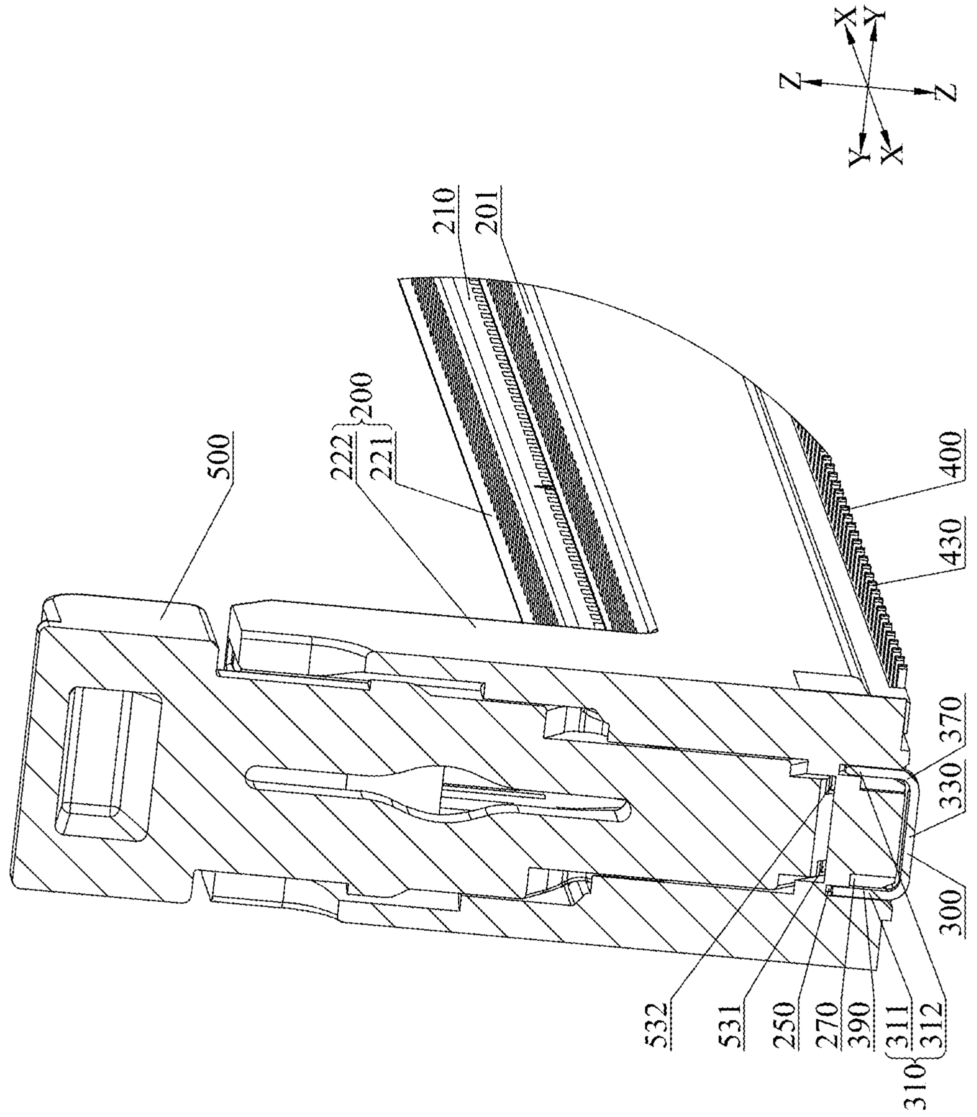
FIG. 7 is a sectional view of the card edge connector as shown in FIG. 4 taken by a plane perpendicular to the longitudinal direction.
Figure 8:
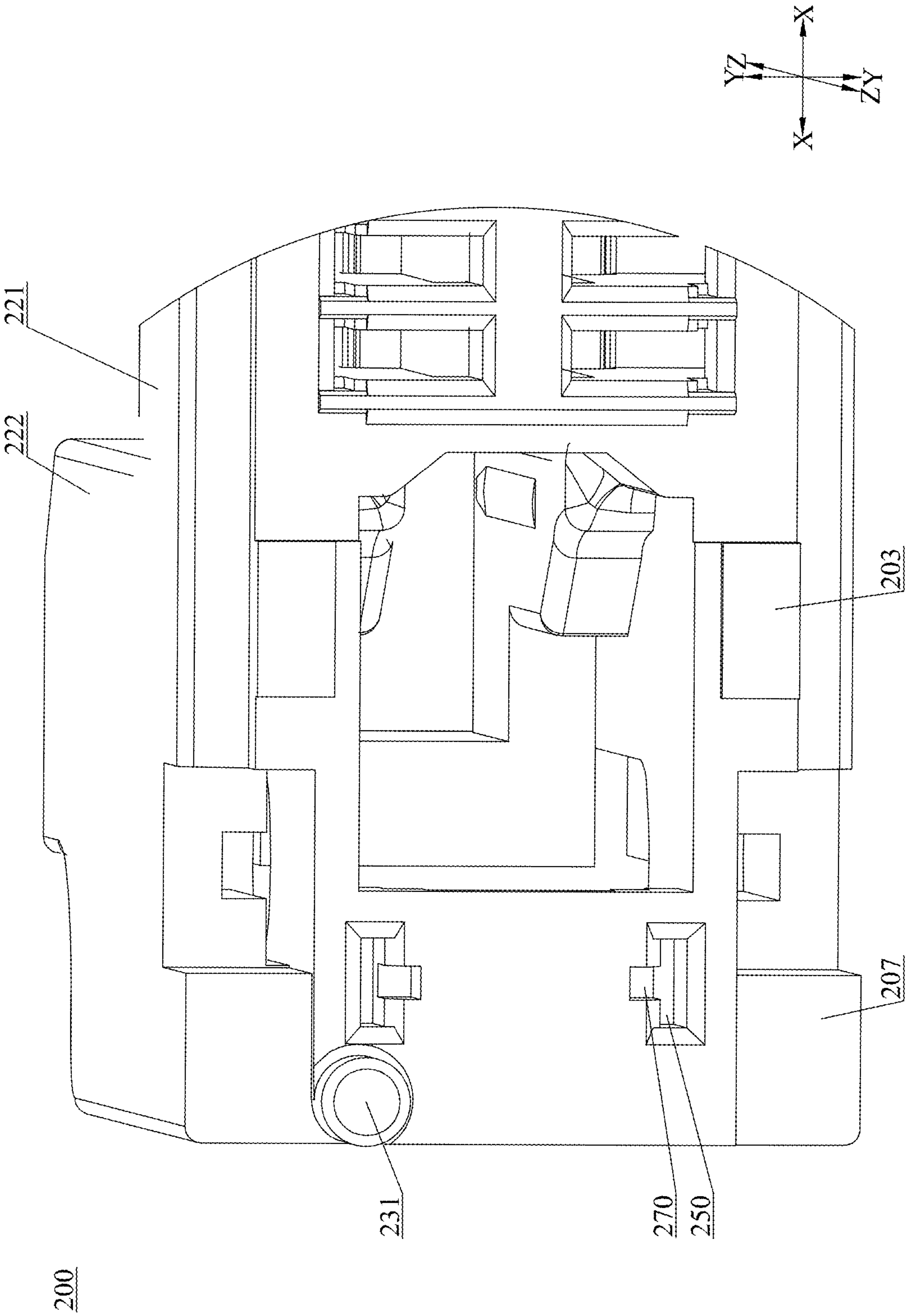
FIG. 8 is a partially enlarged view of an insulating housing as shown in FIG. 4.

As shown in FIGS. 6-7, the board lock 300 may have a body portion 310 and a mounting portion 330. The body portion 310 may be connected to the mounting face 203 of the insulating housing 200 by interference fit, connection with connection pieces and so on. In one embodiment, as shown in FIG. 8, the mounting face 203 may have a groove 250. The groove 250 may be recessed from the mounting face 203 toward the mating face 201. The body portion 310 of the board lock 300 may be inserted into the groove 250 so as to make interference fit with the groove 250. With this configuration, the insulating housing 200 and the board lock 300 can be manufactured separately and then connected together by assembly. This reduces the difficulty of manufacture and thus the cost of manufacture. Optionally, the board lock 300 may also be connected to the mounting face 203 not by insertion, but by injection molding the insulating housing 200 on the body portion 310, by which the body portion 310 is connected to the mounting face 203. However, this may result in increase of processing cost of the insulating housing 200.

Figure 9:
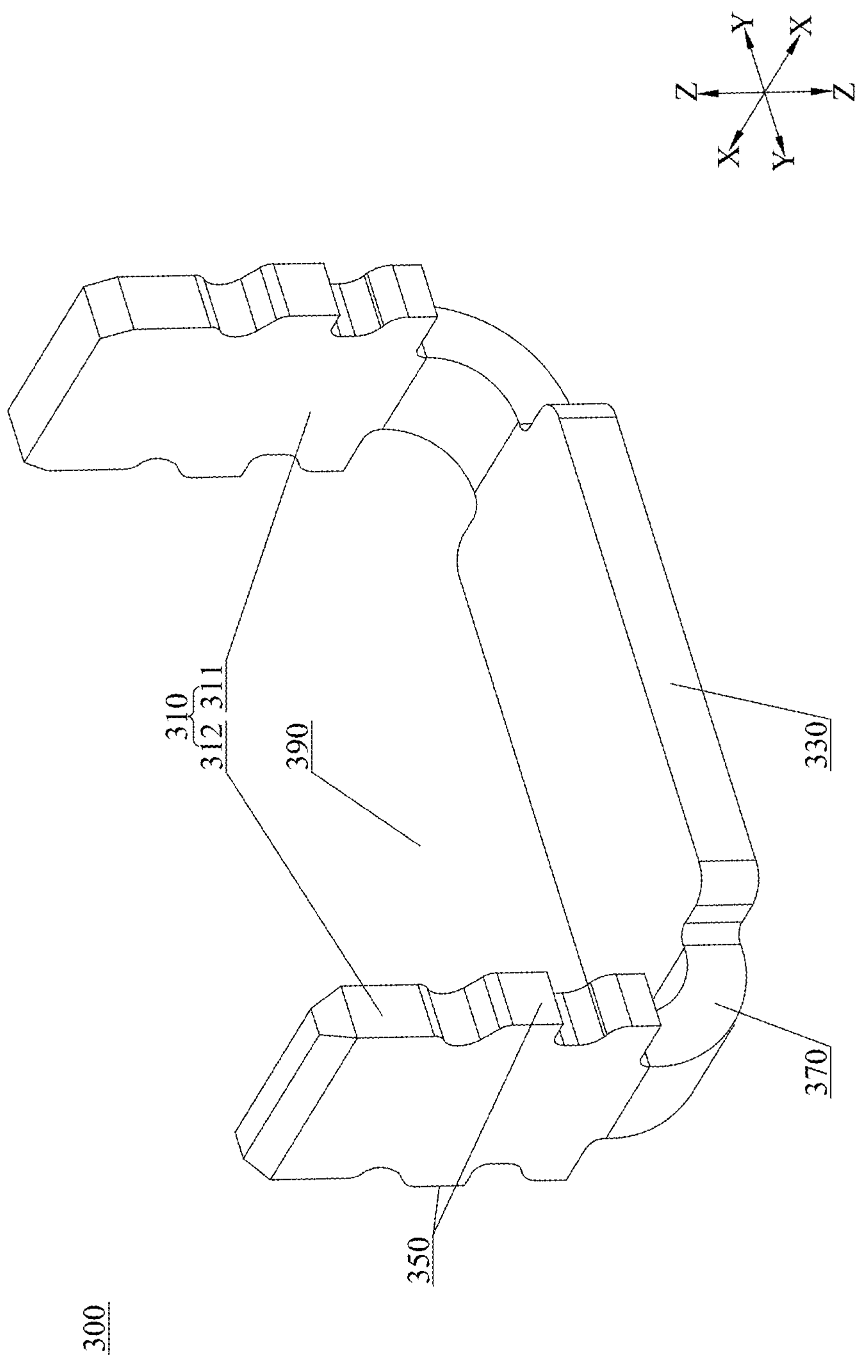
FIG. 9 is a perspective view of a board lock as shown in FIG. 4.
Figure 10B:
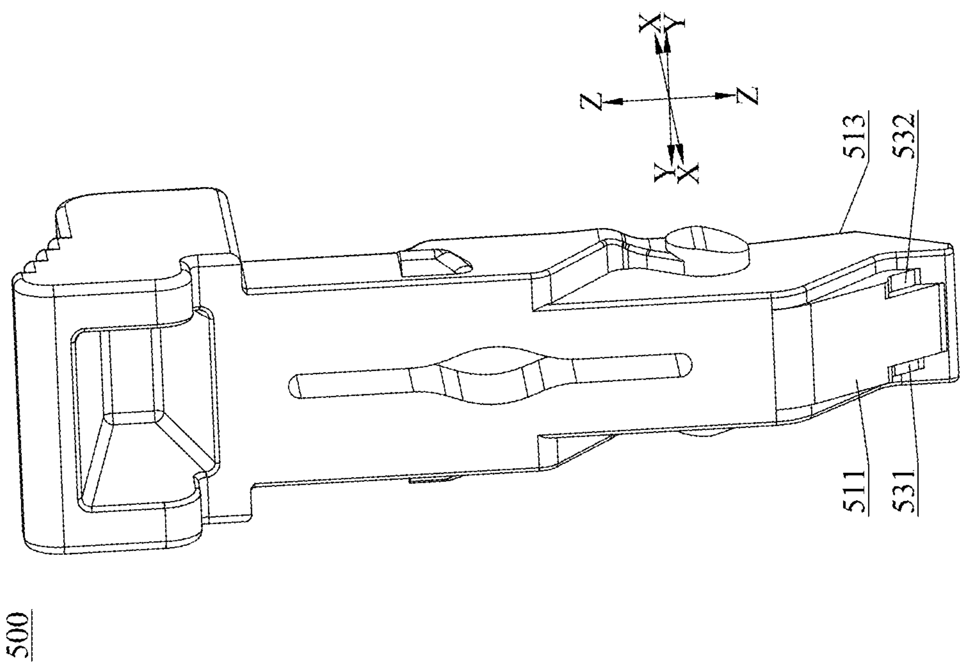
FIG. 10B is a perspective view of the latch as shown in FIG. 4.
Figure 10A:
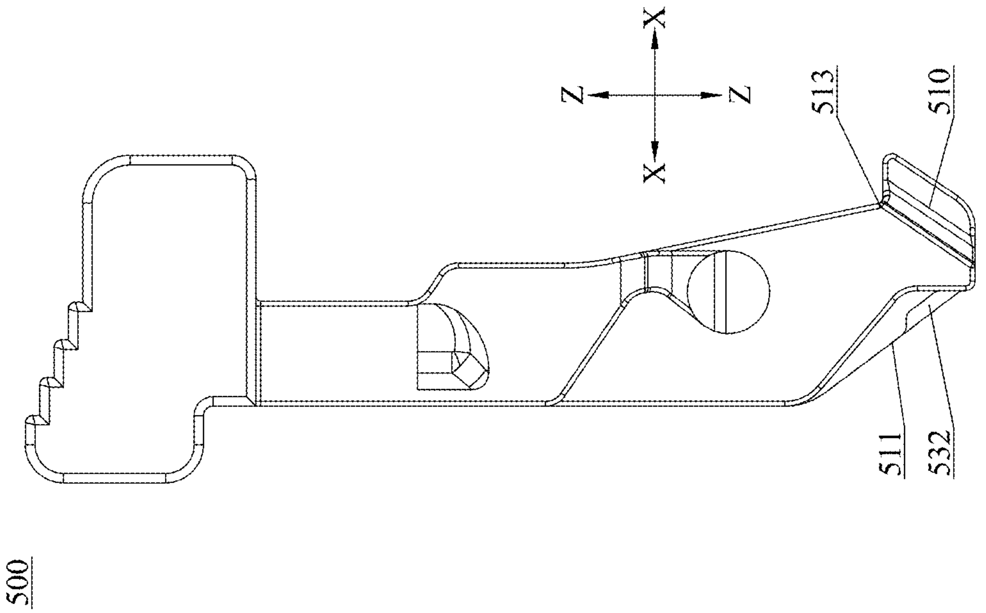
FIG. 10A is a side view of a latch as shown in FIG. 4.
Figure 11:
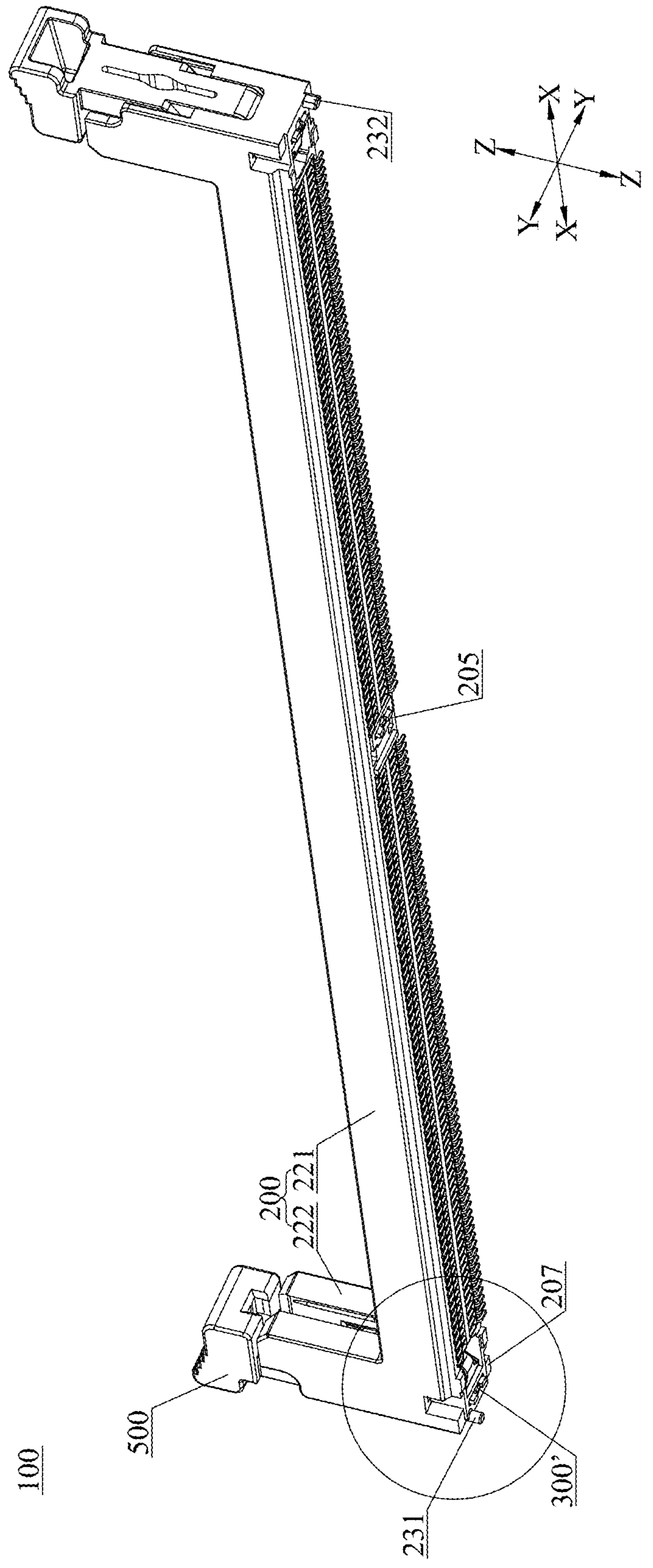
FIG. 11 is a perspective view of a card edge connector according to another exemplary embodiment of the present disclosure.
Figure 12:
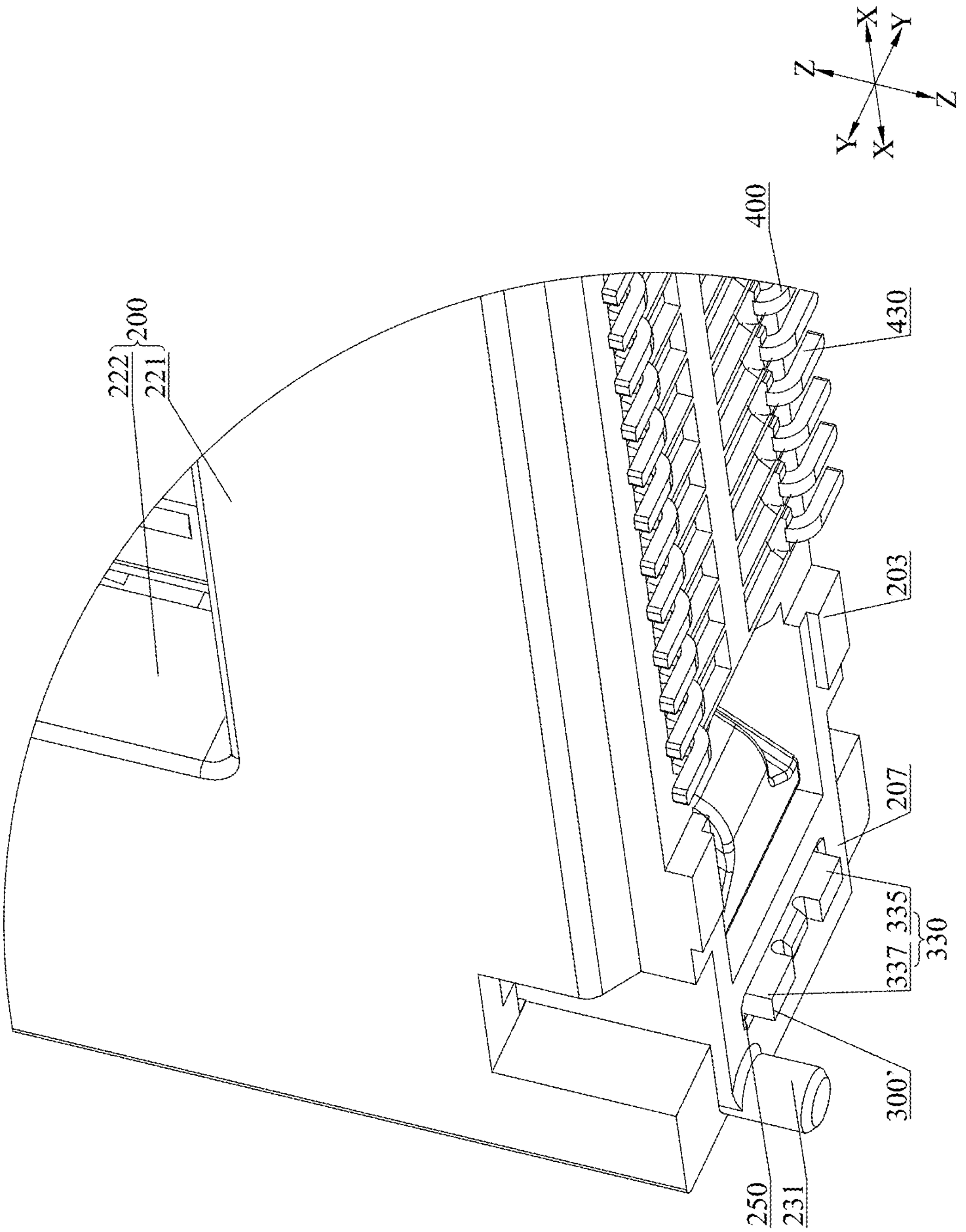
FIG. 12 is a partially enlarged view of the card edge connector as shown in FIG. 11.
Figure 13:
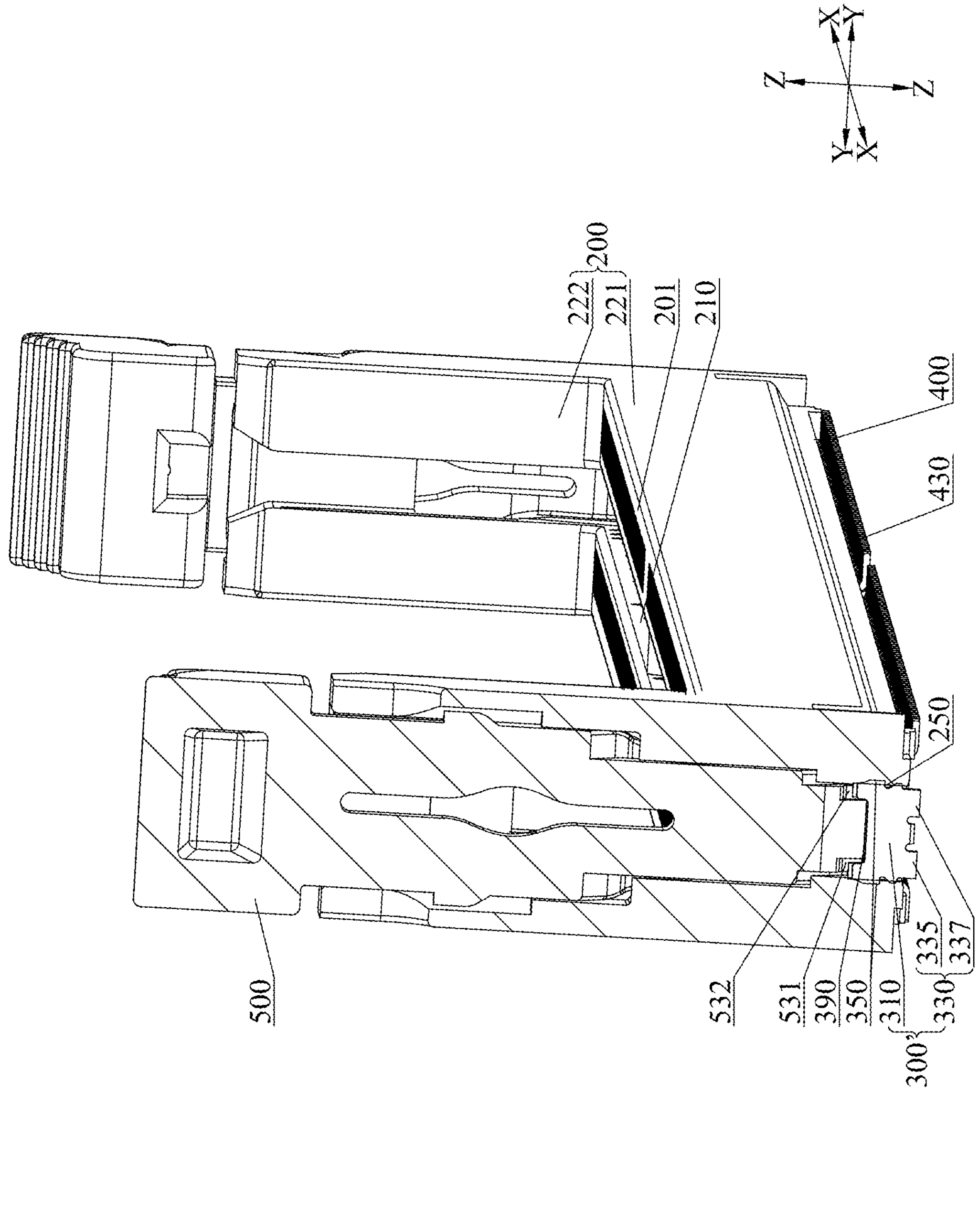
FIG. 13 is a sectional view of the card edge connector as shown in FIG. 11 taken by a plane perpendicular to the longitudinal direction.

Exemplarily, as shown in FIGS. 7 and 9, barbs 350 may be provided on each side of the body portion 310 of the board lock 300. Each pair of barbs 350 may be disposed on the two opposite sides of the body portion 310. The barbs 350 may be one pair, two pairs or more pairs. Each adjacent pair of barbs 350 may be spaced apart along the direction in which the body portion 310 is inserted into the groove 250. The barbs 350 may abut against the side wall of the groove 250 so as to engage with the side wall of the groove 250. By providing the barbs 350, material consumption of the board lock 300 can be reduced, thereby lowering the cost of the card edge connector 100. And, it can also reduce the abutting area of the body portion 310 and the groove 250, thereby reducing the friction in the process of the insertion and facilitating the mounting; moreover, it can reduce the possibility of mismatching of the abutting surfaces due to unevenness of the abutting surfaces and reduce the requirement for processing accuracy.

The mounting portion 330 of the board lock 300 may be constructed to be mounted to a surface of the circuit board by, for example, soldering or welding. In this way, the card edge connector 100 can be fixed to the circuit board by being provided with the board lock 300. Exemplarily, as shown in FIG. 6, the mounting portion 330 may have an end surface 331 parallel to the mounting face 203. The mounting tail 430 of the conductive element 400 may have an end surface 431 parallel to the mounting face 203. The end surface 331 of the mounting portion 330 may be coplanar with the end surface 431 of the mounting tail 430. With this configuration, the mounting portion 330 and the mounting tail 430 can abut against the corresponding surface pads on the circuit board at the same time, and then the mounting tail 430 and the mounting portion 330 of the board lock 300 can be mounted to the corresponding surface pads on the circuit board. In this way, mounting efficiency can be improved.

Exemplarily, as shown in FIG. 7, the depth of the groove 250 may be greater than the length of the body portion 310 of the board lock 300. This enables the position of the body portion 310 within the groove 250 to be adjustable. In this way, according to the position of the mounting tail 430, by adjusting the position of the body portion 310, the height of the mounting portion 330 can be adjusted so that the mounting face 203 of the mounting portion 330 is coplanar with the end surface 431 of the mounting tail 430, or achieve otherwise desired effects. Furthermore, by increasing the depth of the groove 250, the possibility that the body portion 310 cannot be fully inserted into the groove 250 due to processing errors of the groove 250 and/or the body portion 310 can be reduced, accordingly reducing the requirement for processing accuracy.

A connector may include a suitable number of board locks 300 including, but not limited to, one, two or more. There may be a plurality of board locks 300 to improve the connection strength of the interconnection between the card edge connector 100 and the circuit board. The plurality of board locks 300 may be disposed along a length of the connector so as to provide connections to the board at various locations. In some embodiments, the insulating housing 200 may have an intermediate portion 205 and an end portion 207. The intermediate portion 205 may correspond to the rib 211 within the slot 210. The end portions 207 may be disposed at both ends of the insulating housing 200 along the longitudinal direction X-X. The board lock 300 may be provided on one or more of the intermediate portion 205 and the end portions 207. The number of the board locks 300 and the position where they are disposed may be determined according to a desired strength of the connection.

Figure 2:
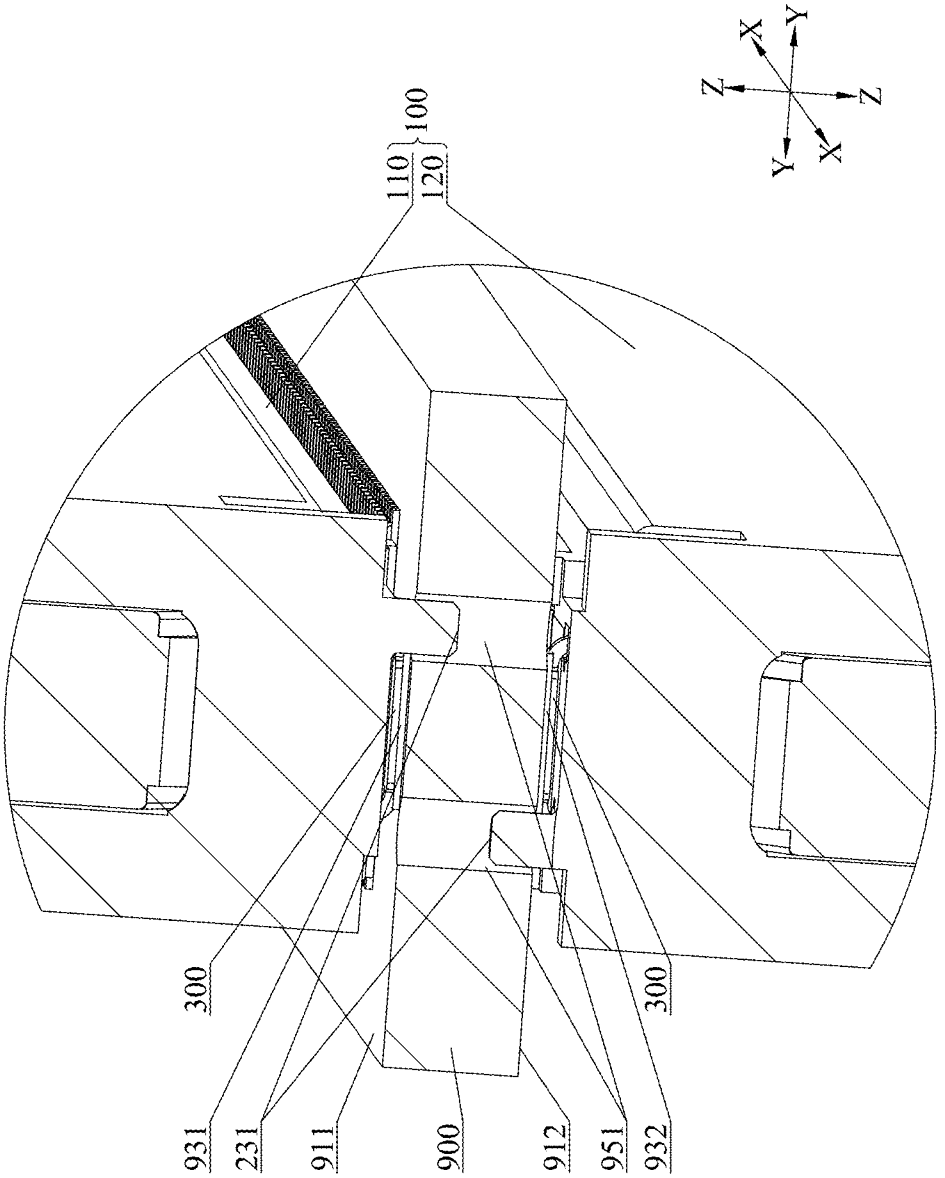
FIG. 2 is a sectional view of the electronic system as shown in FIG. 1 taken by a plane perpendicular to a longitudinal direction.
Figure 3:
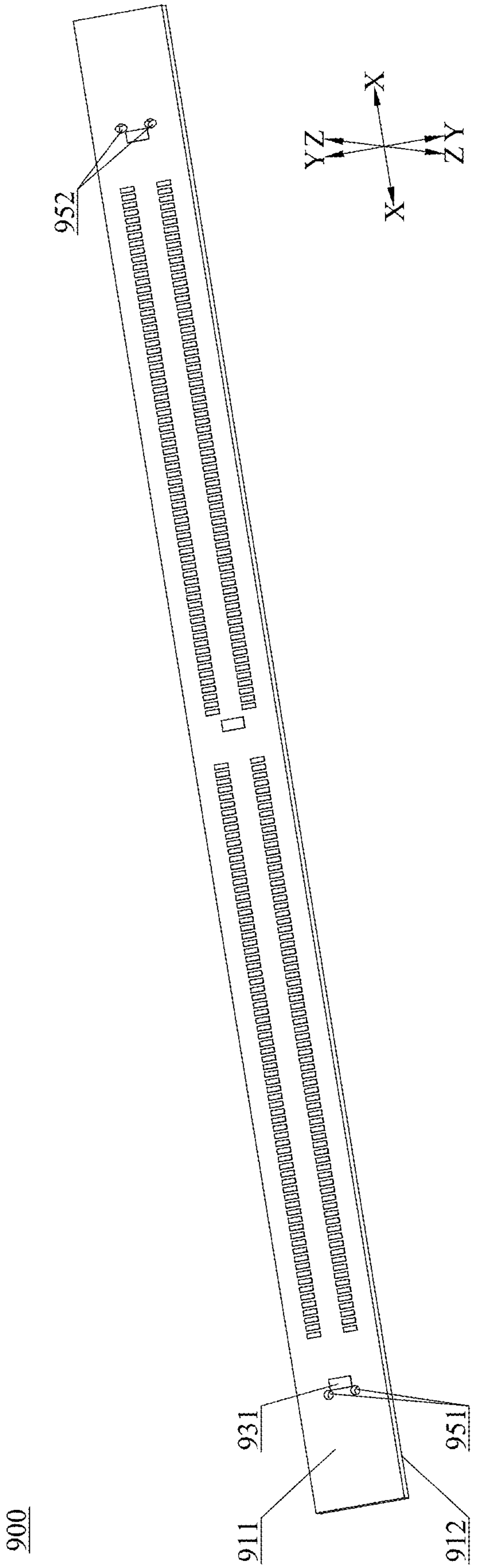
FIG. 3 is a perspective view of a circuit board as shown in FIG. 1.
Figure 4:
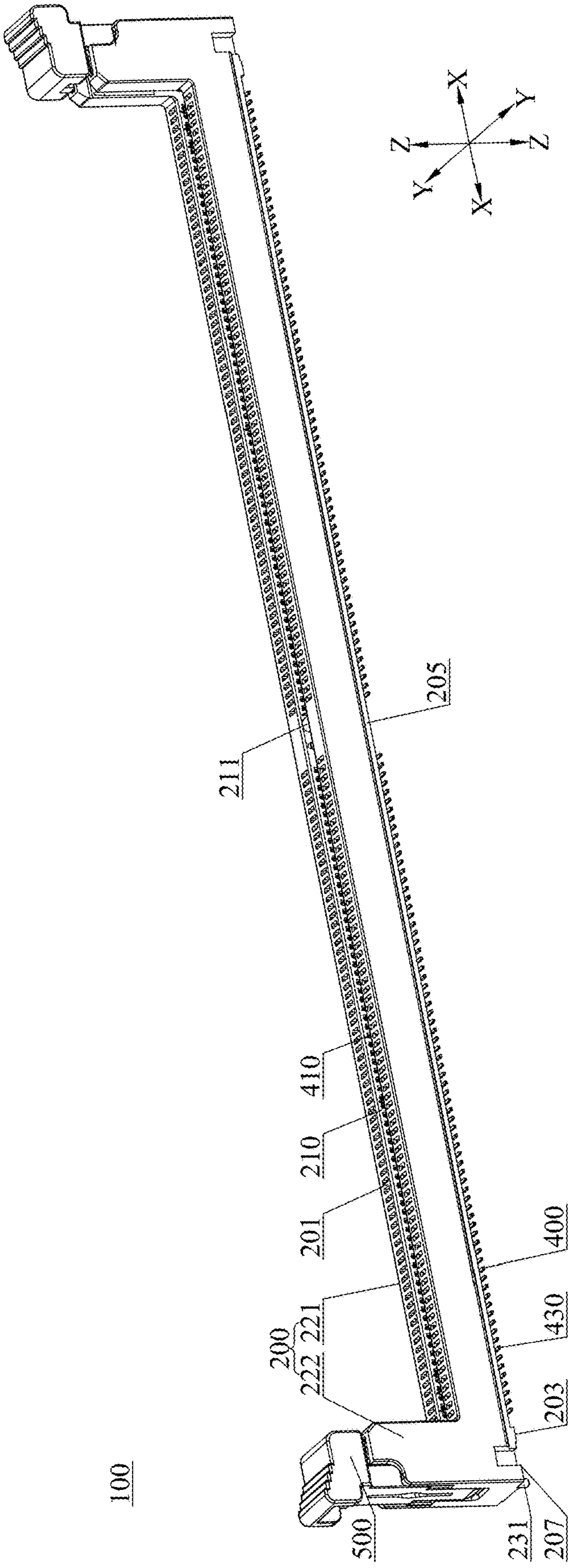
FIG. 4 is a perspective view of a card edge connector from an angle according to an exemplary embodiment of the present disclosure.

As shown in FIGS. 1-3, the electronic system may include a circuit board 900 and two card edge connectors 100 mounted to opposite surfaces of the circuit board 900.

As illustrated, the circuit board 900 may have a first surface 911 and a second surface 912 opposite to each other along the vertical direction Z-Z. The first surface 911 may have a first surface pad 931. The second surface 912 may have a second surface pad 932.

The two card edge connectors 100 may comprise a first card edge connector 110 and a second card edge connector 120. The first card edge connector 110 and the second card edge connector 120 may be the same or different. The mounting portion 330 of the board lock 300 of the first card edge connector 110 may be mounted to the first surface pad 931. The mounting portion 330 of the board lock 300 of the first card edge connector 110 may be disposed in correspondence with the first surface pad 931. In some embodiments, the mounting portions 330 of several board locks 300 of the first card edge connector 110 may be disposed in close proximity so as to be mounted to one first surface pad 931. The mounting portion 330 of the board lock 300 of the second card edge connector 120 may be mounted to the second surface pad 932. The mounting portion 330 of the board lock 300 of the second card edge connector 120 may be disposed in correspondence with the second surface pad 932. In some embodiments, the mounting portions 330 of several board locks 300 of the second card edge connector 120 may be disposed in close proximity so as to be mounted to one second surface pad 932.

Thus, with the card edge connector 100 of the present disclosure, it can occupy only one surface of the circuit board. In this way, the other surface of the circuit board can be used to connect another card edge connector 100. In this way, two card edge connectors can be connected to the same board circuit on both front and back sides, thereby improving space utilization of the board circuit and thus achieving miniaturization. Moreover, as there is no need for connection through holes on the board circuit for connecting the board locks, more space on the board circuit can be available for wiring to have better electrical performance.

Exemplarily, as shown in FIGS. 1-3, the first card edge connector 110 and the second card edge connector 120 may be disposed coincident with each other in a direction perpendicular to the circuit board 900 (or say within the plane defined by the longitudinal direction X-X and the transverse direction Y-Y). With this configuration, the electronic system has a more compact layout in order to avoid occupying more space, thereby providing more available space for other components. Exemplarily, in the direction perpendicular to the circuit board 900, the first surface pad 931 and the second surface pad 932 may be disposed coincident with each other. Alternatively, the first surface pad 931 and the second surface pad 932 may be staggered in the direction perpendicular to the circuit board 900, and the mounting portion 330 of the board lock 300 of the first card edge connector 110 and the mounting portion 330 of the board lock 300 of the second card edge connector 120 may be disposed at different positions, and/or mounted to different positions on the first surface pad 931 and the second surface pad 932, respectively, to achieve coincident disposition of the first card edge connector 110 and the second card edge connector 120.

Figure 5:
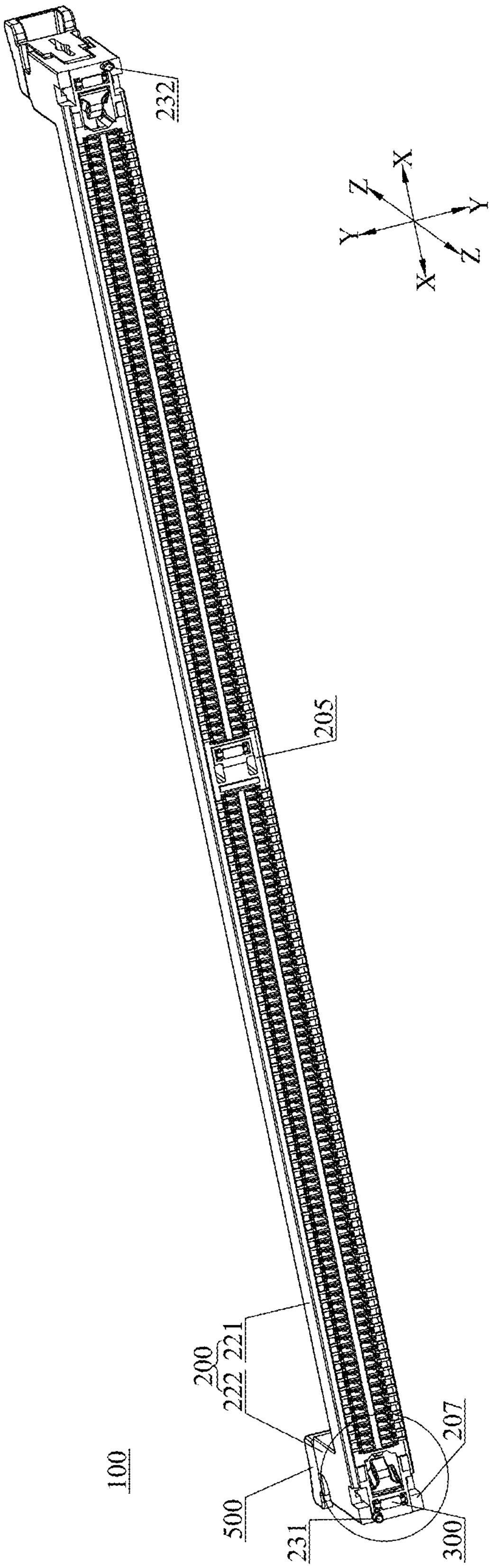
FIG. 5 is a perspective view of the card edge connector as shown in FIG. 4 from another angle.

Exemplarily, as shown in FIGS. 5-8, the insulating housing 200 may include a first positioning post 231 and a second positioning post 232 at two ends respectively. The first positioning post 231 and the second positioning post 232 each may protrude from the mounting face 203. The first positioning post 231 and the second positioning post 232 may be disposed at a diagonal line of the mounting face 203. Exemplarily, with respect to the status of the insulating housing 200 as shown in FIG. 5, the first positioning post 231 may be disposed at the upper left corner of the insulating housing 200 and the second positioning post 232 may be disposed at the lower right corner of the insulating housing 200.

Exemplarily, as shown in FIG. 3, the circuit board 900 may have two first positioning holes 951 and two second positioning holes 952. The two first positioning holes 951 may be provided on the circuit board 900 at the positions corresponding to one end of (e.g., the left end) the first card edge connector 110 and the same end of the second edge connector 120. The two second positioning holes 952 may be positioned on the board circuit 900 at the positions corresponding to the other end (e.g., the right end) of the first card edge connector 110 and the same end of the second edge connector 120. Specifically, the first positioning post 231 and the second positioning post 232 of the first card edge connector 110 may be respectively inserted into the first positioning hole 951 and the second positioning hole 952 distributed on a diagonal line; the first positioning post 231 and the second positioning post 232 of the second card edge connector 120 may be respectively inserted into the other first positioning hole 951 and the other second positioning hole 952 distributed on the other diagonal line. In this way, the first card edge connector 110 and the second card edge connector 120 can be positioned on the board circuit 900, thereby facilitating the connection to the board circuit 900. In addition, compared with other structures, by positioning the first positioning post 231 and the second positioning post 232 on the diagonal line of the mounting face 203, the forces on the card edge connector 100 and the circuit board 900 can be more evenly distributed so as to avoid deformation or cracking.

The two first positioning holes 951 may be disposed symmetrically about the central line of the first card edge connector 110 extending along the longitudinal direction X-X. The two second positioning holes 952 may be disposed symmetrically about the central line of the first card edge connector 110 extending along the longitudinal direction X-X. With this configuration, the two first positioning holes 951 and the two second positioning holes 952 may be staggered to avoid interference with each other. In the case that the circuit on the circuit board permits, the aforesaid symmetrical disposition of the two first positioning holes 951 and the two second positioning holes 952 about the central line can bring significant benefits. The card edge connector mounted on the first surface 911 of the circuit board 900 can also be mounted on its second surface 912, and the card edge connector mounted on the second surface 912 of the circuit board 900 can also be mounted on its first surface 911. As will be mentioned below, even where the first positioning post 231 and the second positioning post 232 have different structures, it is possible to make each card edge connector bilaterally mountable.

Exemplarily, the first positioning post 231 and the second positioning post 232 may be the same or different. In one preferable embodiment, the first positioning post 231 and the second positioning post 232 may have different cross-sections. The said cross-sections are taken by cutting the first positioning post 231 and the second positioning post 232 along a direction perpendicular to the extending direction of the first positioning post 231 and the second positioning post 232, respectively. The cutting disconnects the first positioning post 231 and the second positioning post 232, each of which no longer has a complete structure. In the embodiment as shown in the figures, the cross-section of the first positioning post 231 may be circular and the cross-section of the second positioning post 232 may be in a cloud-like shape. In other embodiments not shown in the figures, the cross-section of the first positioning post 231 may be circular and the cross-section of the second positioning post 232 may be rectangular, and so on, as long as the cross-sections of the two are different. The two positioning posts with different cross-sections may provide a fool-proofing function to prevent the card edge connector 100 from being mounted in a wrong direction.

Exemplarily, as shown in FIG. 9, the body portion 310 of the board lock 300 may be perpendicular to the mounting portion 330. As shown in FIG. 6, the mounting portion 330 may be parallel to the mounting face 203. With this configuration, the mounting portion 330 has a larger contact area with the surface pad on the board circuit, thereby increasing the soldering area and accordingly the strength of the soldering.

Exemplarily, as shown in FIG. 9, the board lock 300 further comprises a transition portion 370. The transition portion 370 may connect the body portion 310 and the mounting portion 330. The width of the transition portion 370 may be less than the width of the body portion 310 and the width of the mounting portion 330. The curvature radius of the transition portion 370 may be configured such that the board lock 300 is easier to be processed and formed from a single piece of plate and the production cost thereof is lower. Moreover, since the transition portion 370 connects the body portion 310 and the mounting portion 330, the reduction of its width can reduce material consumption of the board lock 300, thereby lowering the cost of the card edge connector 100.

Exemplarily, as shown in FIG. 7, there may be a gap between all sides of the transition portion 370 and the insulating housing 200. As mentioned above, the transition portion 370 connects the body portion 310 and the mounting portion 330. By providing the gap, it is possible to avoid the contact between the transition portion 370 and the insulating housing 200, thereby avoiding an external force applied to the transition portion 370 by the insulating housing 200. In addition, no contact between the transition portion 370 and the insulating housing 200 can also reduce the contact area between the board lock 300 and the insulating housing 200, which may reduce the transfer of heat from the mounting portion 330 to the insulating housing 200 generated during the mounting (e.g., solder reflow), thereby maintaining the stability of the insulating housing 200 in terms of performance and shape in SMT.

Exemplarily, as shown in FIGS. 7-8, the insulating housing 200 may include a recessed portion 270. The recessed portion 270 may be coupled to the groove 250. The transition portion 370 may cover the side wall of the recessed portion 270 so as to surround the recessed portion 270. The opening of the recessed portion 270 may face to the transition portion 370. By providing the recessed portion 270, the contact area between the insulating housing 200 and the board lock 300 can be reduced, thereby decreasing the heat transfer efficiency during the mounting (e.g., solder reflow). The material consumption for manufacturing the insulating housing 200 can also be reduced, thereby lowering the cost of the card edge connector 100.

Exemplarily, as shown in FIG. 7, the mounting portion 330 may be spaced apart from the insulating housing 200. In this way, in the process of the mounting portion 330 being mounted to the surface pad on the circuit board, the transfer of heat to the insulating housing 200 can be suppressed, thereby preventing the insulating housing 200 from being deformed due to overheating.

Exemplarily, as shown in FIGS. 7-9, the body portion 310 of the board lock 300 may comprise a first body portion 311 and a second body portion 312. The first body portion 311 and the second body portion 312 may be disposed on opposite sides of the mounting portion 330 along the transverse direction Y-Y. The first body portion 311 and the second body portion 312 may each be connected to the mounting portion 330 by the transition portion 370. The board lock 300 may be U-shaped. In the embodiment where the grooves 250 are provided on the mounting face 203, as shown in FIGS. 6-8, the first body portion 311 and the second body portion 312 may be inserted into the two grooves 250, respectively. The two grooves 250 may be disposed opposite each other along the transverse direction Y-Y. By providing the first body portion 311 and the second body portion 312, the strength of the connection between the board lock 300 and the insulating housing 200 can be increased, thereby preventing the two from being disconnected.

Exemplarily, as shown in FIG. 9, the first body portion 311 and the second body portion 312 may both be parallel to the longitudinal direction X-X. Since the card edge connector 100 is illustrated as extending along the longitudinal direction X-X, with the dimension in the longitudinal direction being larger, while the dimension in the transverse direction Y-Y being smaller, both the first body portion 311 and the second body portion 312 may be parallel to the longitudinal direction X-X, thus the insulating housing 200 may have sufficient space along the longitudinal direction X-X to accommodate the first body portion 311 and the second body portion 312. The dimension of the first connection 311 and the second connection 312 may also be relatively larger. This ensures that both the board lock 300 and the insulating housing 200 have sufficient mechanical strength.

Exemplarily, as shown in FIG. 7, the first body portion 311 and the second body portion 312 may be respectively disposed on two sides of the slot 210 along the transverse direction Y-Y. The first body portion 311 and the second body portion 312 may also be configured to protect the slot 210 to prevent the slot 210 from being deformed or cracked.

Optionally, the body portion of the board lock may extend along the transverse direction Y-Y. In this case, the board lock may be disposed on the outside of a latch 500, i.e. the body portion of the board lock is closer to the end of the insulating housing 200 than the latch 500. Exemplarily, as shown in FIGS. 11-14, the body portion 310 of the board lock 300' may extend along the transverse direction Y-Y. Exemplarily, as shown in FIGS. 15-18, the body portion 310 of the board lock 300" may extend along the transverse direction Y-Y. The body portion 310 of the board lock 300' in the embodiment as shown in FIGS. 11-14 and the body portion 310 of the board lock 300" as shown in FIGS. 15-18 may have a similar structure. When the body portion 310 of the board lock extends along the transverse direction Y-Y, each board lock may comprise only one body portion 310.

Figure 18:
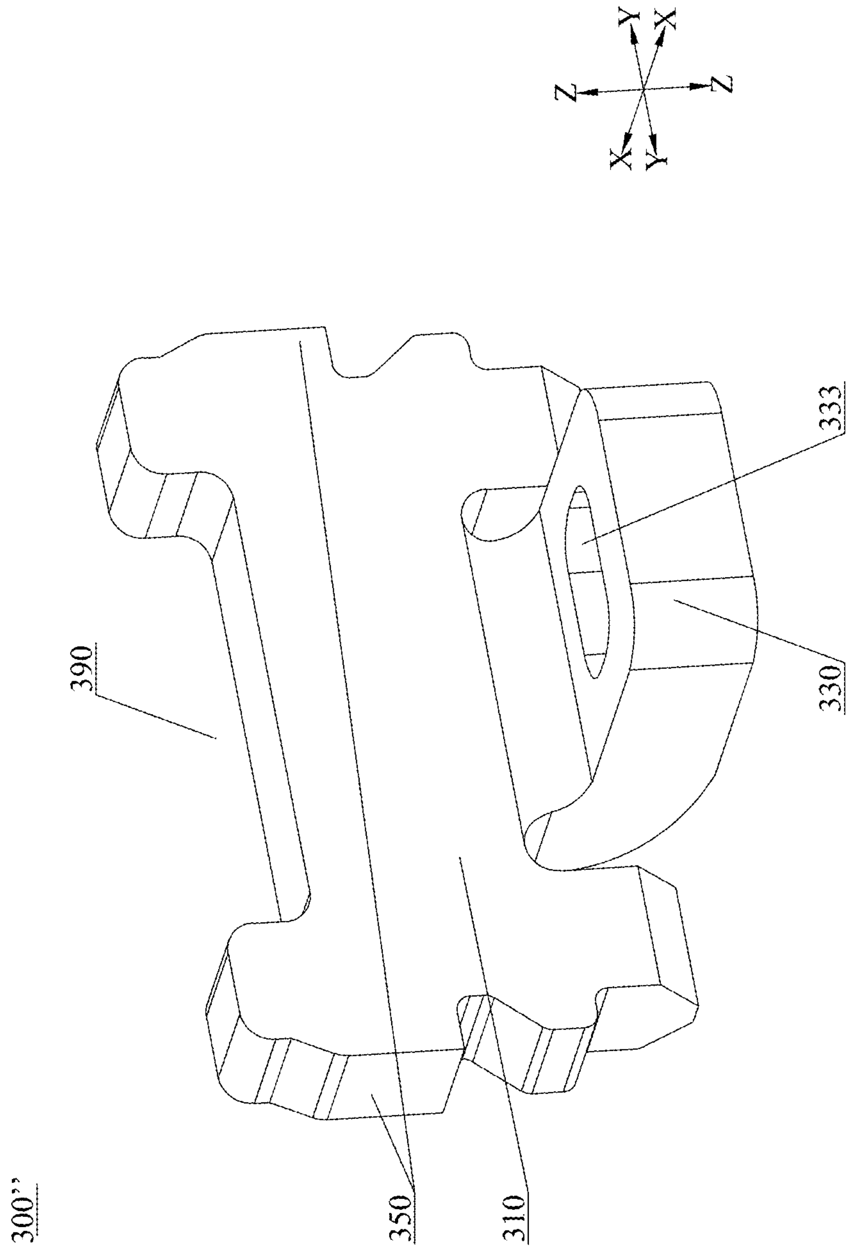
FIG. 18 is a perspective view of the board lock as shown in FIG. 15.

Exemplarily, as shown in FIG. 18, the mounting portion 330, relative to the body portion 310, may be bent toward an end of the insulating housing 200. In this way, the mounting portion 330 is closer to the outside of the insulating housing 200, thereby facilitating the mounting process.

Exemplarily, as shown in FIG. 18, the mounting portion 330 may have a through-hole 333. With this configuration, the mounting portion 330 may be soldered also inside the through-hole 333 during being mounted to the surface pad on the board circuit, thereby further improving the strength of the soldering. Moreover, by providing the through-hole 333, the material consumption of the board lock 300" can be reduced, thus lowering the cost of the card edge connector 100.

Exemplarily, the board lock 300' may be in the form of a flat plate, as shown in FIGS. 11-14. The board lock 300' may extend along the transverse direction Y-Y. With this configuration, the board lock 300' has a simpler structure and is less expensive to manufacture.

Figure 14:
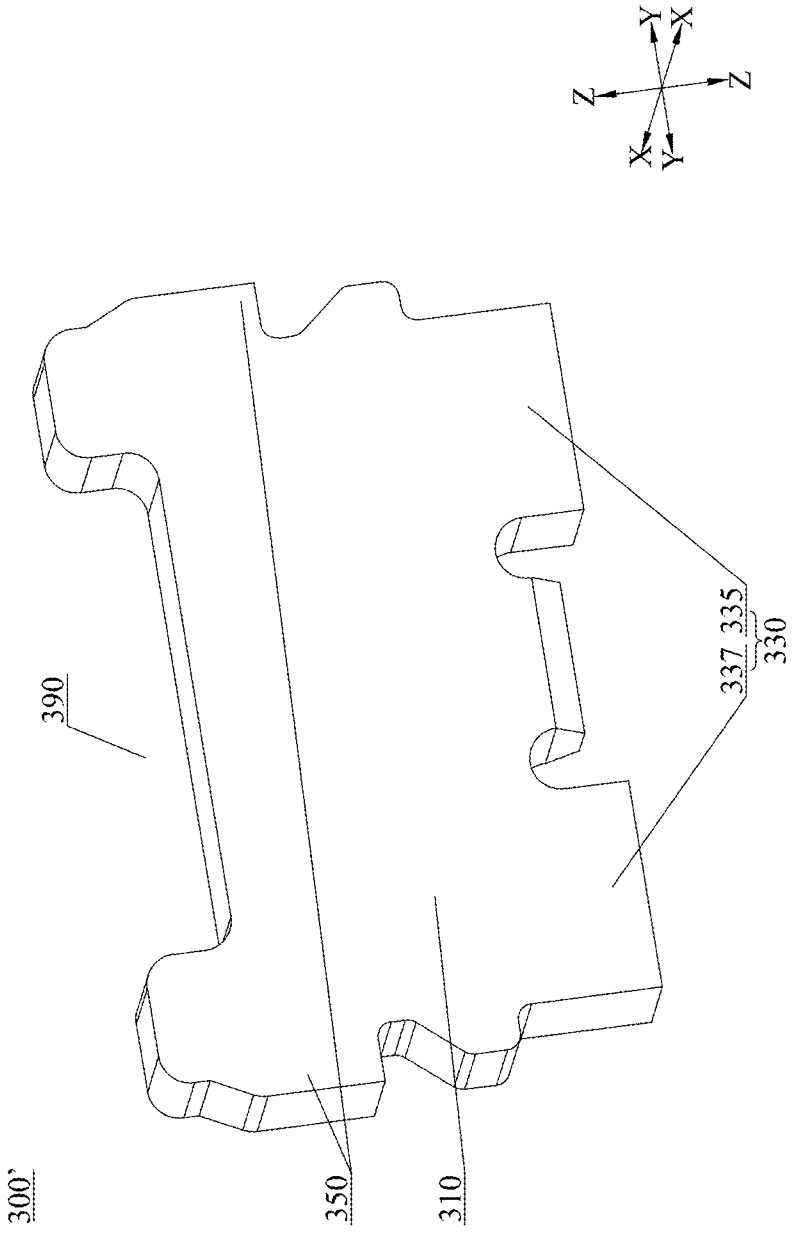
FIG. 14 is a perspective view of the board lock as shown in FIG. 11.
Figure 15:
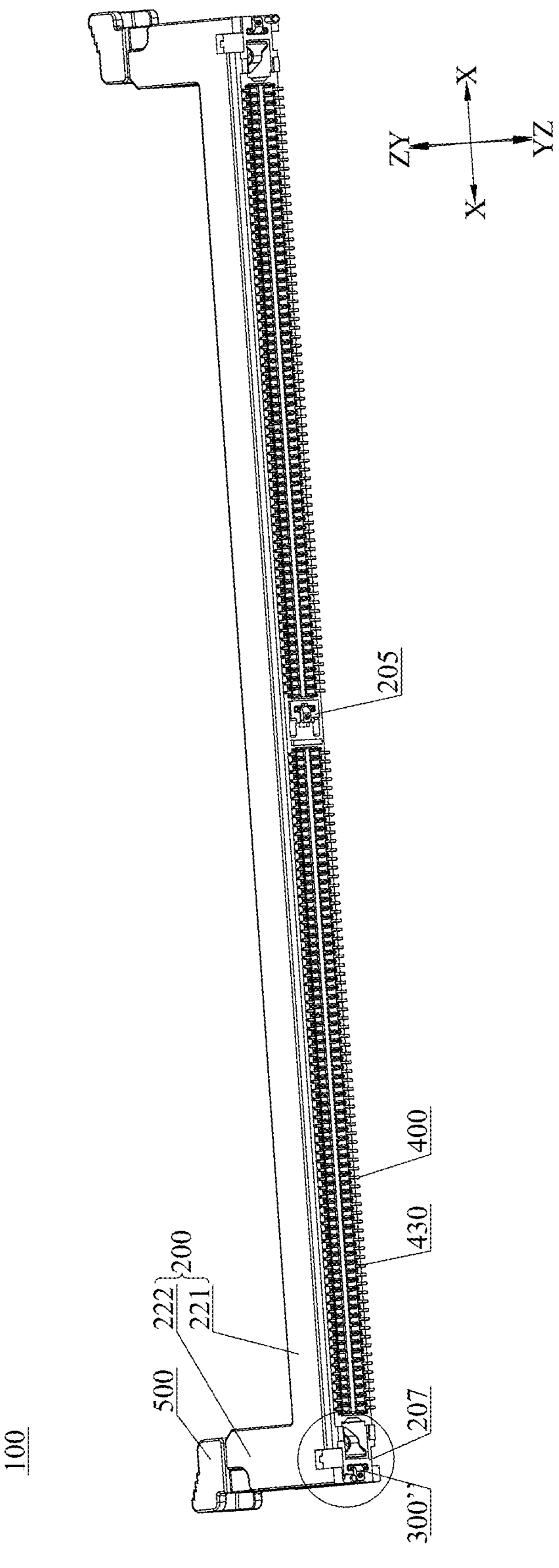
FIG. 15 is a perspective view of a card edge connector according to a further exemplary embodiment of the present disclosure.
Figure 16:
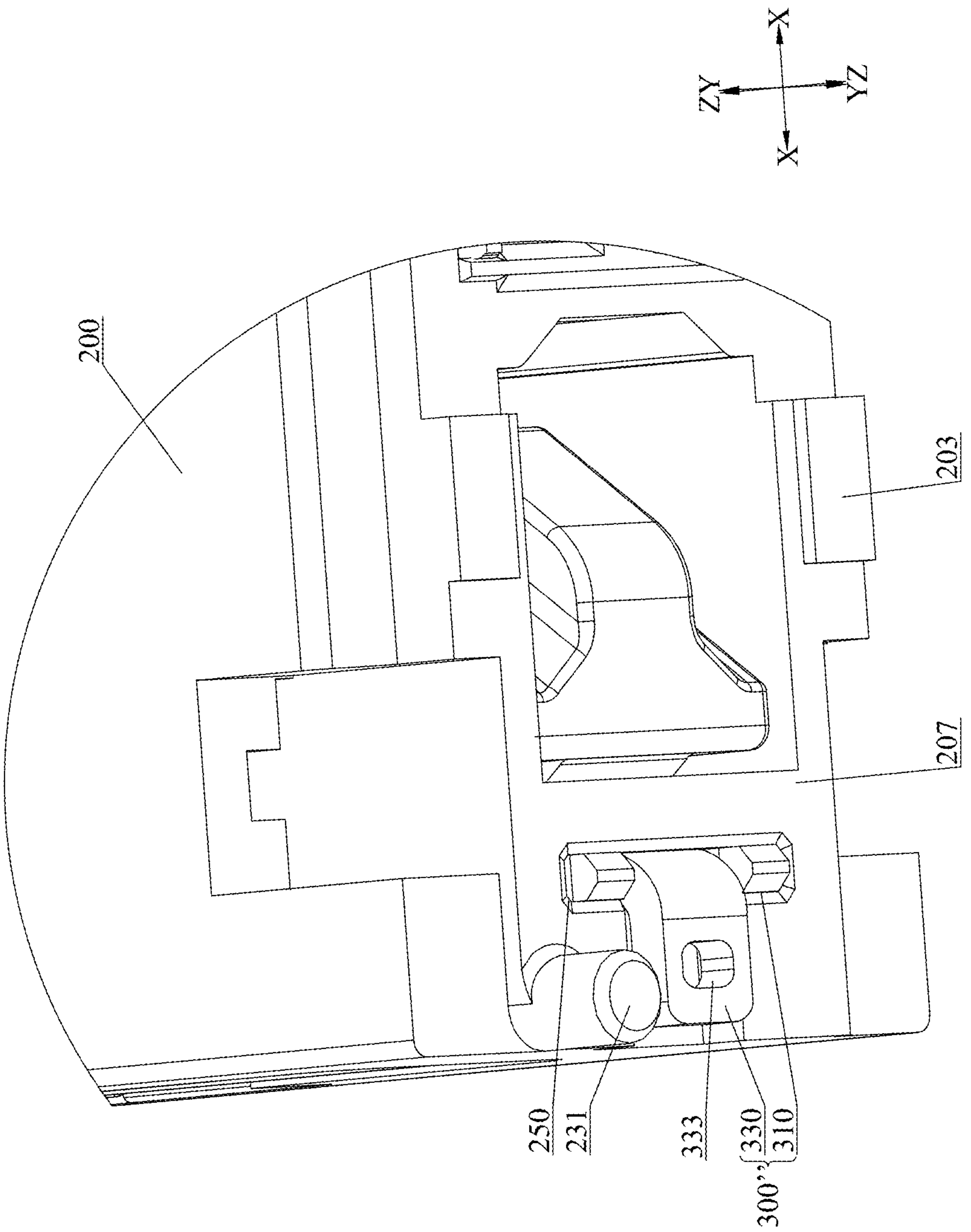
FIG. 16 is a partially enlarged view of the card edge connector as shown in FIG. 15.
Figure 17:
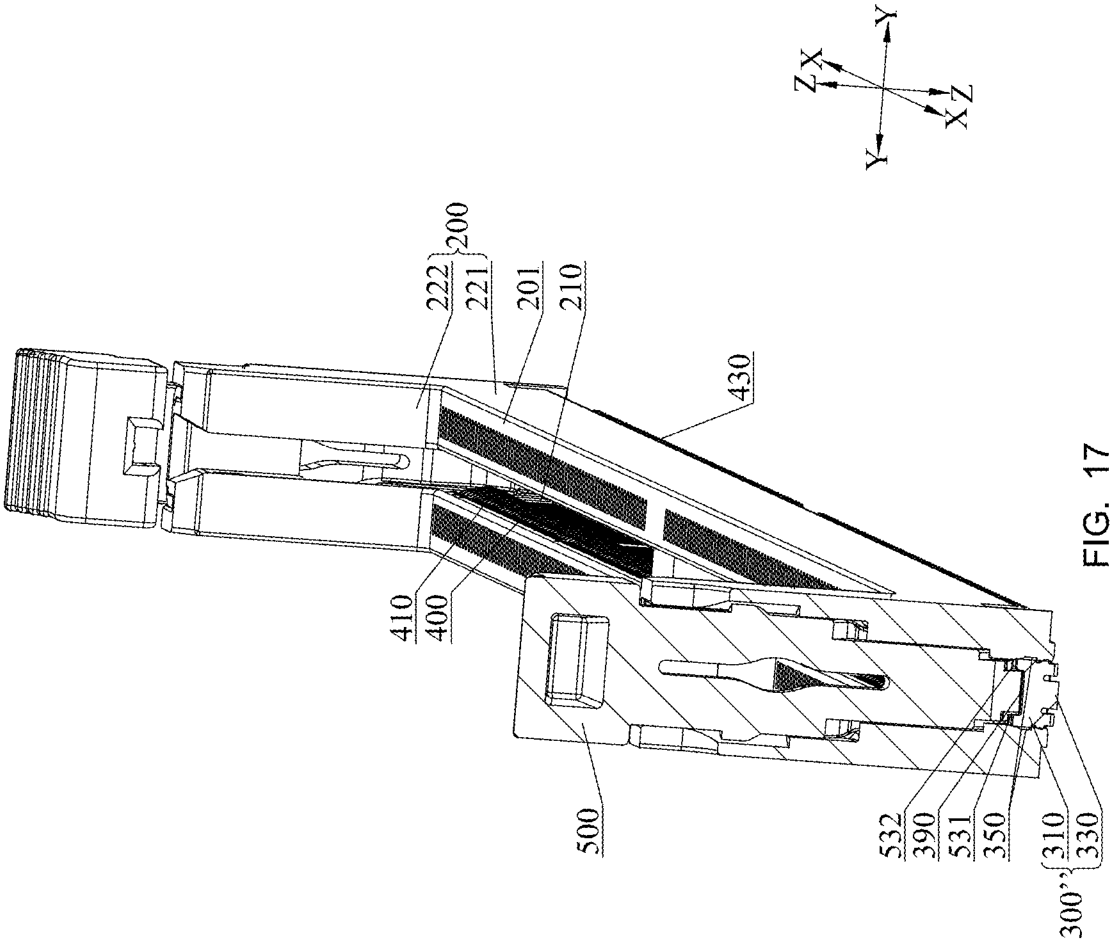
FIG. 17 is a sectional view of the card edge connector as shown in FIG. 15 taken by a plane perpendicular to the longitudinal direction.

Exemplarily, as shown in FIG. 14, the mounting portion 330 may comprise a first mounting portion 335 and a second mounting portion 337. The first mounting portion 335 and the second mounting portion 337 may be disposed spaced apart along the transverse direction Y-Y. By providing the first mounting portion 335 and the second mounting portion 337, the mounting portion 330 has a larger contact area with the surface pad on the circuit board, thereby increasing the soldering area and accordingly the strength of the soldering. A V-cut may be disposed between the first mounting portion

335 and the second mounting portion 337 to facilitate separation of a plurality of board locks 300' after being manufactured together.

The differences between the three embodiments are described above. The same signs may be used for the parts that are identical or similar in the three embodiments, which may not be described in detail with respect to each of the three embodiments.

As shown in FIGS. 4-7, the end of the insulating housing 200 may have the latch 500. The latch 500 may be pivotally connected to the end of the insulating housing 200 between a locked position and an unlocked position. Exemplarily, the tail of the latch 500 may be pivotably connected to the tower 222 between the locked position and the unlocked position. The head of the latch 500 is inserted into a recess on the side edge of the electronic card when the latch 500 is in the locked position, thereby the electronic card being locked to the card edge connector. The board lock 300 may be provided on the tower 222. The board lock 300 may be provided underneath the tail of the latch 500. The first body portion 311 and the second body portion 312 may be inserted from the mounting face 203 into the tower 222 below the latch 500. Exemplarily, as shown in FIG. 9, a space 390 may be provided in the middle of the side of the body portion 310 facing to the mating face 201. The opening of the space 390 may be orientated toward the tail 510 of the latch 500. Exemplarily, the latch 500 may hold the electronic card within the slot 210 when the latch 500 is in the locked position. The tail 510 of the latch 500 may lift the electronic card up and the electronic card can be removed from the slot 210, when the latch 500 is in the unlocked position. By providing the space 390, the latch 500 can be pivotable between the locked position and the unlocked position through the space 390, which can make the structure of the card edge connector 100 more compact, thereby miniaturization.

Exemplarily, as shown in FIGS. 4-8, the tail 510 of the latch 500 may have an outer side 511 facing to the space 390 and an inner side 513 facing to the slot 210. A first notch 531 and a second notch 532 may be respectively provided at two ends of the outer side 511 along the transverse direction Y-Y. In this way, the transverse width of the outer side 511 may be less than that of the inner side 513. The transverse width of the space 390 may be greater than that of the outer side 511. The transverse width of the space 390 may be less than that of the inner side 513. With this configuration, the portion of the latch 500 extending into the space 390 can be larger, thereby enable a more compact structure of the card edge connector 100 and accordingly miniaturization.

The present disclosure has been described through the above embodiments, but it should be understood that a variety of variations, modifications and improvements may be made by a person skilled in the art according to the teaching of the present disclosure, and these variations, modifications and improvements all fall within the spirit of the present disclosure and the claimed scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

Moreover, although many creative aspects have been described above with reference to the right angle connectors, it should be understood that the aspects of the present disclosure are not limited to these. Any one of the creative features, whether alone or combined with one or more other creative features, can also be used for other types of card edge connectors, such as vertical connectors and coplanar connectors, and the like.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below." In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A card edge connector, comprising:

a housing comprising a mating face, a mounting face, a slot extending from the mating face toward the mounting face, end portions on opposite sides of the slot, and an intermediate portion between the end portions;

a plurality of conductive elements held by the housing, each of the plurality of conductive elements comprising a mating contact portion curving into the slot, a mounting tail extending beyond the mounting face and comprising an end surface configured to be mounted to a surface pad on a circuit board, and an intermediate portion joining the mating contact portion and the mounting tail; and a plurality of board locks comprising a first board lock disposed at one of the end portions of the housing and a second board lock disposed at the intermediate portion of the housing, each of the plurality of board locks comprising a body portion disposed in the housing and a mounting portion connected to the body portion, the mounting portion comprising an end surface parallel to the end surfaces of the mounting tails of the plurality of conductive elements.

2. The card edge connector of claim 1, wherein:

the plurality of board locks comprise a third board lock disposed at the other end portion of the housing.

3. The card edge connector of claim 1, wherein:

the housing comprises a first positioning post and a second positioning post protruding from the mounting face at opposite ends of the housing, respectively; and the first positioning post and the second positioning post are disposed on opposed sides of the slot.

4. The card edge connector of claim 3, wherein:

each of the first positioning post and the second positioning post is offset from a centerline of the slot;

the first positioning post and the second positioning post are asymmetrical with respect to the centerline of the slot; and the mounting tails of the plurality of conductive elements are symmetrical about the centerline of the slot.

5. The card edge connector of claim 1, wherein:

the housing comprises a groove with an opening at the mounting face; and the body portion of the second board lock is disposed in the groove.

6. The card edge connector of claim 5, wherein:

a depth of the groove is greater than a length of the body portion of the second board lock such that a position of the body portion within the groove is adjustable.

7. The card edge connector of claim 5, wherein:

the body portion of the second board lock comprises barbs on opposite sides; and the barbs engage side walls of the groove.

8. The card edge connector of claim 1, wherein:

the body portion of the second board lock extends perpendicular to the mounting portion; and the mounting portion of the second board lock extends parallel to the mounting face of the housing.

9. The card edge connector of claim 8, wherein:

the second board lock comprises a transition portion joining the body portion and the mounting portion; and a width of the transition portion is less than a width of the body portion and a width of the mounting portion.

10. The card edge connector of claim 9, wherein:

the housing comprises a recessed portion at a position surrounded by the transition portion; and an opening of the recessed portion faces the transition portion.

11. The card edge connector of claim 1, wherein:

the mounting portion comprises a first mounting portion and a second mounting portion spaced apart from each other.

12. A card edge connector, comprising:

a housing comprising a mating face, a mounting face, and a slot extending from the mating face toward the mounting face;

a plurality of conductive elements held by the housing, each of the plurality of conductive elements comprising a mating contact portion curving into the slot, a mounting tail extending beyond the mounting face, and an intermediate portion joining the mating contact portion and the mounting tail;

a latch disposed in the housing and pivotable between a locked position and an unlocked position; and a board lock comprising a body portion disposed in the housing and extending in a vertical direction and a mounting portion extending in a direction perpendicular to the vertical direction, wherein:

the body portion of the board lock comprises a space facing the mating face of the housing; and an opening of the space of the body portion of the board lock faces the latch.

13. The card edge connector of claim 12, wherein:

the body portion is a first body portion;

the board lock comprises a second body portion; and the first body portion and the second body portion are disposed on opposite sides of the mounting portion so that the board lock is U-shaped.

14. The card edge connector of claim 13, wherein:

the first body portion and the second body portion are disposed on opposite sides of the slot.

15. The card edge connector of claim 12, wherein:

the slot extends in a longitudinal direction perpendicular to the vertical direction; and the body portion extends in a plane perpendicular to the longitudinal direction.

16. The card edge connector of claim 15, wherein:

the mounting portion extends toward an end of the housing.

17. The card edge connector of claim 15, wherein:

the mounting portion comprises a through-hole.

18. The card edge connector of claim 1, wherein:

the body portion of the second board lock comprises a space facing the mating face of the housing;

the card edge connector comprises a latch disposed in the housing and pivotable between a locked position and an unlocked position; and an opening of the space of the body portion of the second board lock faces a tail of the latch.

19. An electronic system, comprising:

a circuit board having a first surface and a second surface on opposite sides; and a first card edge connector mounted to the first surface of the circuit board and a second card edge connector mounted to the second surface of the circuit board, each of the first card edge connector and the second card edge connector comprising:

a housing comprising a mating face, and a mounting face facing a respective one of the first surface of the board and the second surface of the circuit board, and a board lock comprising a body portion disposed in the housing and a mounting portion connected to the body portion and mounted to the respective one of the first surface of the board and the second surface of the circuit board.

20. The electronic system of claim 19, wherein:

the circuit board comprises a first surface pad on the first surface, a second surface pad on the second surface, and two positioning holes each extending through the first surface and the second surface and disposed adjacent to the first surface pad and the second surface pad;

the mounting portion of the board lock of the first card edge connector is mounted to the first surface pad on the first surface of the circuit board;

the mounting portion of the board lock of the second card edge connector is mounted to the second surface pad on the second surface of the circuit board;

the first card edge connector comprises a first positioning post disposed in one of the two positioning holes of the circuit board; and the second card edge connector comprise a second positioning post disposed in the other one of the two positioning holes of the circuit board.

* * * * *